(12) United States Patent
Peleska et al.

(10) Patent No.: US 10,509,762 B2
(45) Date of Patent: Dec. 17, 2019

(54) DATA RATE-ADAPTIVE DATA TRANSFER BETWEEN MODEMS AND HOST PLATFORMS

(71) Applicant: Intel IP Corporation, Santa Clara, CA (US)

(72) Inventors: Pavel Peleska, Graefelfing (DE); Reinhold Schneider, Veitsbronn (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/967,225

(22) Filed: Apr. 30, 2018

(65) Prior Publication Data

US 2019/0042522 A1 Feb. 7, 2019

(51) Int. Cl.
*G06F 13/42* (2006.01)
*G06F 13/16* (2006.01)
*G06F 1/3203* (2019.01)

(52) U.S. Cl.
CPC ........ *G06F 13/4282* (2013.01); *G06F 1/3203* (2013.01); *G06F 13/1668* (2013.01); *G06F 2213/0026* (2013.01)

(58) Field of Classification Search
CPC ............... G06F 13/4282; G06F 1/3203; G06F 13/1668; G06F 2213/0026
See application file for complete search history.

(56) References Cited

U.S. PATENT DOCUMENTS

| | | | | |
|---|---|---|---|---|
| 5,852,742 | A * | 12/1998 | Vondran, Jr. | ........... G06K 15/02 712/28 |
| 2011/0199909 | A1* | 8/2011 | Walley | ..................... G10L 19/00 370/241 |
| 2016/0205026 | A1* | 7/2016 | Zhovnirnovsky | ..... H04L 43/087 370/235 |
| 2016/0224442 | A1* | 8/2016 | Sanghi | ................ G06F 11/2028 |
| 2016/0239445 | A1* | 8/2016 | Davis | ..................... G06F 13/364 |
| 2017/0085475 | A1* | 3/2017 | Cheng | ..................... H04L 45/74 |
| 2017/0366596 | A1* | 12/2017 | Han | ....................... H04L 1/0006 |
| 2018/0150125 | A1* | 5/2018 | HomChaudhuri | .... G06F 1/3275 |

OTHER PUBLICATIONS

Gen-Z Consortium; "Gen-Z Core Specification", (2016-2018); vol. 1; 983 pages.
PCI Express; "PCI Express Base Specification," Feb. 19, 2014; Rev. 4.0, Version 0.3; 1053 pages.
RapidIO; "Interconnect Specification Part 1: Input/Output Logical Specification 4.0," (Jun. 2016); 1495 pages.

* cited by examiner

*Primary Examiner* — Vineeta S Panwalkar
(74) *Attorney, Agent, or Firm* — Schwabe, Williamson & Wyatt, P.C.

(57) ABSTRACT

Systems, methods, and computer-readable media for transferring data between a host platform and modem circuitry are provided. At low data rates, data may be stored by on-chip memory, and data may be transferred from the on-chip memory to the host platform over an interconnect (IX) when a first aggregation period expires. At medium data rates, data may be stored in both the on-chip memory and in in-package or off-chip memory, and the data may be transferred from the on-chip memory and off-chip memory to the host platform over the IX when a second aggregation period expires. At high data rates, the on-chip memory may serve as an elastic buffer, and the data may be streamed directly through the on-chip memory to the host platform over the IX. Other embodiments are described and/or claimed.

25 Claims, 9 Drawing Sheets

DATA RATE-ADAPTIVE DATA TRANSFER BETWEEN MODEMS AND HOST PLATFORMS

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Many current Long Term Evolution (LTE) modem implementations use a Peripheral Component Interconnect Express (PCIe) IX to connect and transfer data from a modem platform to a host platform. In these implementations, received data is stored in modem off-chip memory as it arrives over the air (OTA) interface during an aggregation period. When the aggregation period expires, the PCIe link is activated and the data is delivered to the host platform. This way of temporarily storing data in the modem off-chip memory may help to save power and reduce energy consumption for data rates currently provided by Fourth Generation (4G) Long Term Evolution (LTE) (e.g., approximately 300-400 megabits per second (Mbits) depending on the user equipment category, bandwidth size, modulation and coding scheme (MCS), Multiple Input Multiple Output (MIMO) scheme, etc.), since the power needed to write data and read it back to/from modem off-chip memory is lower than the power needed for keeping the PCIe link in the active state.

BRIEF DESCRIPTION OF THE DRAWINGS

The included drawings are for illustrative purposes and serve to provide examples of possible structures and operations for the disclosed embodiments. The drawings in no way limit any changes in form and detail that may be made by one skilled in the art without departing from the spirit and scope of the disclosed concepts.

DETAILED DESCRIPTION

Figure 1:
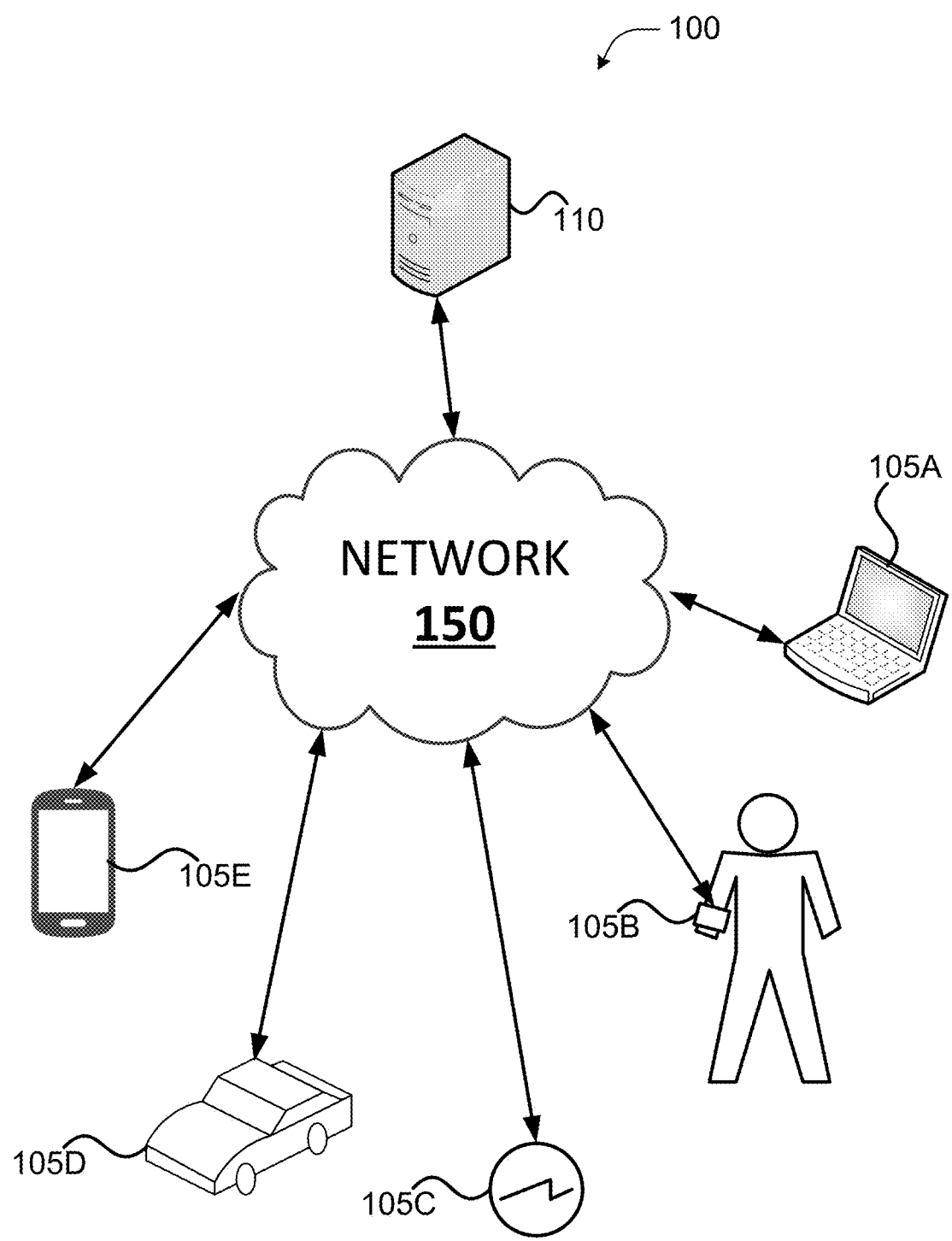
FIG. 1 illustrates an example of interconnect assignments in accordance with various embodiments.

Disclosed embodiments are related to data transfer rate-adaptive modes of delivering data from modem circuitry to a host platform. The embodiments are related to improving use of interconnects (IXs) between cellular modems and host platforms for high data rate communications, which are predicted to be available in future cellular networks, such as Third Generation Partnership Project (3GPP) Fifth Generation (5G) networks. The following description, for ease of understanding, provides various examples related to 3GPP 5G and Long Term Evolution (LTE) systems; however, the example embodiments are not limited in this regard and the described embodiments may apply to various devices and various network technologies that may benefit from the principles described herein, such as future implementations of LTE systems, Institute of Electrical and Electronics Engineers (IEEE) 802.16 protocols (e.g., Wireless metropolitan area networks (MAN), Worldwide Interoperability for Microwave Access (WiMAX), etc.), or the like.

Many current Long Term Evolution (LTE) modem implementations use a Peripheral Component Interconnect Express (PCIe) IX to connect and transfer data from a baseband processor to a host platform. PCIe is a high performance, general purpose input/output (I/O) IX mechanism defined for a wide variety of current and future computing and communication platforms, and may be used as an IX between highly integrated peripheral controller components, peripheral add-in cards, processor/memory systems, and/or the like. PCIe includes various attributes, such as its usage model, load-store architecture, and software interfaces, as well as a highly scalable, fully serial interface. PCIe takes advantage of recent advances in point-to-point interconnects, switch-based technology, and packetized protocol to deliver new levels of performance and features. Power Management, Quality Of Service (QoS), Hot-Plug/Hot-Swap support, Data Integrity, and Error Handling are among some of the advanced features supported by PCIe.

The host platform may include one or more application processors, system memory, data storage devices, and other like components. PCIe may operate in a mode using link1 (L1)-substates, which allow the PCIe to toggle between a low-power idle "off" state (e.g., the PCIe L1.1 and L1.2 sub-states) and high-power "on" state (e.g., the PCIe L0 state) under an "aggregation period" regime. In these implementations, the aggregation period scheme may be used to conserve battery life because PCIe IXs may consume a relatively large amount of energy when active or in the "on" state. The aggregation period scheme may include storing data packets in in-package or off-chip memory (e.g., double data rate (DDR) memory) as data packets are received over-the-air (OTA) and while the PCIe IX is in the "off" state. Storing the data packets off-chip may include operations such as writing the data packets to the off-chip memory, reading the data packets back to an on-chip buffer when an aggregation period expires, and then sending the buffered data to the host platform as transmission bursts. Such data aggregation schemes may make sense for the data transmission rates provided by currently deployed LTE networks since the power (or energy consumption) used to transfer the data packets to/from the off-chip memory is less than the power (or energy consumption) used to keep the PCIe IX continuously active. However, using data aggregation schemes for the larger data rates provided by 5G networks may end up consuming more energy due to more data transfers to the off-chip memory and constantly switching the PCIe IX on and off. Additionally, for future LTE network deployments and 5G network deployments, each of which are predicted to provide data transmission rates of approximately 2 Gigabits per second (Gbps), the current data aggregation schemes may not make sense since the "on" state of the IX link is typically not long enough to transfer such high volumes of data to the host platform (e.g., such as when the IX link is a PCIe first generation link).

Embodiments herein provide a rate-adaptive data transfer scheme, where data packets are transferred to the host platform depending on a current data rate. In embodiments, different data rate thresholds may be used to optimize energy consumption of the IX link(s) between the baseband processor and host platform. In embodiments, the thresholds may be based on the particular hardware of the modem circuitry, for example, a size of on-chip memory and/or buffers, aggregation periods, IX/link speed, and platform specific power consumption characteristics of the host interface. In some embodiments three data rate thresholds or operation modes may be used. A first mode may be used for low data rates, where data packets may be buffered using on-chip memory (e.g., static random access memory (SRAM)) and transferred to the application processor in constant or regular bursts, for example, 1 ms or 2 ms bursts. A second mode may be used for medium data rates, where data packets may be offloaded to off-chip memory (e.g., DRAM) in a same or similar manner as the data rate modulation scheme discussed above. A third mode may be used for high data rates, where the PCIe link is left in the "on" state and data packets are streamed to the application processor.

In embodiments, the host platform may include one or more application processors and one or more memory devices, and the modem circuitry may include a System on Chip (SoC) with baseband processor circuitry and on-chip memory circuitry. The modem circuitry may include interconnect (IX) interface circuitry (e.g., a peripheral component interconnect express (PCIe) interface controller) that couples the modem circuitry with the host platform via a first IX (e.g., a PCIe IX). The modem circuitry may also include an off-chip (or "off-board") memory circuitry (e.g., double data rate (DDR) random access memory (RAM)) coupled with the SoC via a second IX (e.g., a PCIe IX, a Ultra Path Interface (UPI) IX). Other embodiments are described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in various embodiments," "in some embodiments," and the like are used repeatedly. These phrases generally do not refer to the same embodiments; however, they may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be rearranged. A process may be terminated when its operations are completed, but may also have additional operations not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Referring to the figures, FIG. 1 illustrates an arrangement 100 in which various embodiments may be practiced. Arrangement 100 includes computer system 110 (or "system 110"), network 150, and computer devices 105A-E (collectively referred to as "computer devices 105," "computer device 105" or the like).

The computer devices 105 may be embodied as any type of computation or computer device capable of performing various arithmetic, logical, input/output (I/O) operations, including, without limitation, sending and receiving packets to the system 110 over network 150. In this regard, the computer devices 105 may include processors, memory devices, I/O interfaces, network interface cards, various radio communications devices, and/or other like components. Examples of computer devices 105 may include mobile devices, such as a smartphone (e.g., computer device 105E), a wearable computer device (e.g., computer device 105B), desktop computers, workstations, laptop or notebook computers (e.g., computer device 105A), tablet computers, in-vehicle computing systems (e.g., computer device 105D), Internet of Things (IoT) devices (e.g., computer device 105C), and/or the like. As shown, by FIG. 1, the computer devices 105 are depicted as user, client, or edge computer devices; however, in other embodiments, the computer devices 105 may include wireless access points (e.g., a network switch and/or a network router, a base station, and the like) in a wired or wireless communication network. According to various embodiments, any of the computer devices 105, and in particular computer device 105E, may include the rate adaptive technology discussed herein. In such embodiments, one or all of the computer devices 105 may include modem circuitry that may transfer data packets to a host platform depending on a current data transmission rate, and different data transmission rate thresholds may be used to optimize energy consumption of an interconnects/link(s) between the modem circuitry and the host platform. These embodiments are discussed in more detail infra.

Network 150 may comprise computers, network connections among the computers, and software routines to enable communication between the computers over network connections. In this regard, the network 150 may each comprise one or more network elements that may include one or more processors, communications systems (e.g., including network interface controllers, one or more transmitters/receivers connected to one or more antennas, etc.), and computer-readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 150 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 150 may require that the computers execute software routines which enable, for example, the seven layers of the Open System Interconnection (OSI) model of computer networking or equivalent in a wireless (cellular) phone network.

Network 150 may be used to enable relatively long-range communication such as, for example, between the system 110 and the computer devices 105. The network 150 may represent the Internet, one or more cellular networks, a local area network (LAN), a wireless LAN (WLAN), or a wide area network (WAN) including proprietary and/or enterprise networks, or combinations thereof. In some embodiments, the network 150 may be associated with a network operator who owns or controls equipment and other elements necessary to provide network-related services, such as one or more base stations or access points, one or more servers for routing digital data or telephone calls (for example, a core network or backbone network), etc. In some embodiments, the system 110 may be part of the infrastructure that provides network-related services to computer devices 105.

The system 110 may comprise one or more hardware computing devices that provide one or more services to users (e.g., computer devices 105) over a network (e.g., network 150). The system 110 may include one or more processors, one or more memory devices, one or more network interfaces, etc. In various embodiments, the system 110 may be a server (e.g., stand-alone, rack-mounted, blade, etc.) or network appliance (e.g., physical or virtual), In some embodiments, the system 110 may perform the functions of a network element, such as a software router; a software switch; a distributed software switch; a distributed software router; a switched fabric for distributed services; a stand-alone software switch/router or an underline fabric for distributed services in the scope of a network functions virtualization (NFV), and/or a software-defined networking (SDN) architecture. Examples of SDNs may include one or more elements or nodes of an evolved packet core (EPC), a fifth generation (5G) new radio (NR) core network, or the like.

Figure 2:
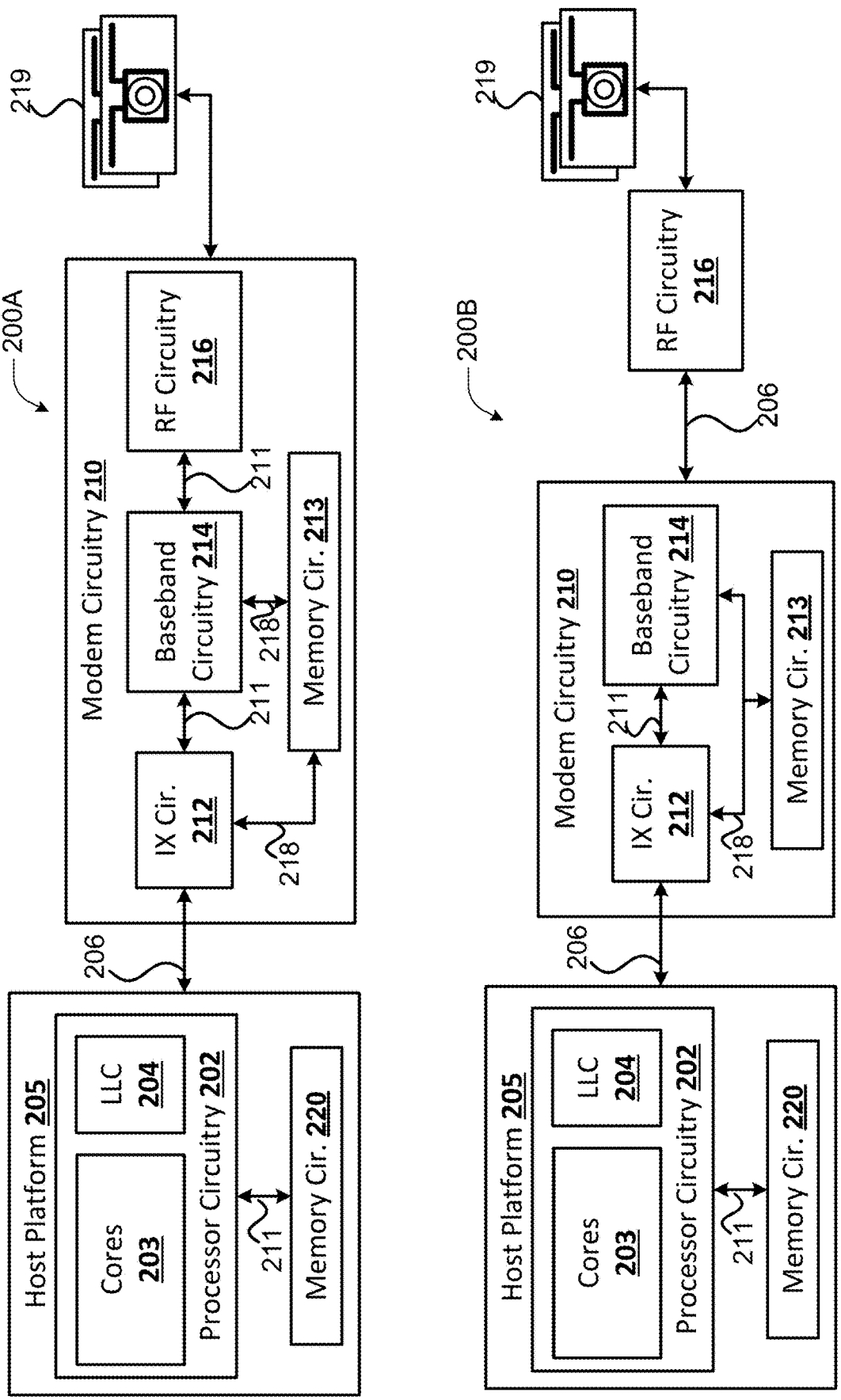
FIG. 2 illustrates example implementations of a computer system in accordance with various embodiments.

FIG. 2 illustrates example implementations of a system 200 in accordance with various embodiments. In particular, FIG. 2 shows block diagrams of example components that may be present in computer system 200A or 200B (collectively referred to as "system 200," "systems 200," or the like), which may implemented in or by one or more UEs 105 or system 110 discussed previously. The system 200 may include any combinations of the components shown by FIG. 2, and the components may be implemented as integrated circuits (ICs) or portions thereof, discrete electronic devices, or other modules, logic, hardware, software, firmware, middleware or a combination thereof adapted in the system 200, or as components otherwise incorporated within a chassis of a larger system.

FIG. 2 shows system 200A of a first embodiment, which may include a host platform 205, modem circuitry 210, and printed antennas 219, each of which may be coupled via interconnects (IX) 206. In this embodiment, the modem circuitry 210 may include IX interface circuitry 212, baseband circuitry 214, off-chip (or "off-board") memory circuitry 213, and radiofrequency (RF) circuitry 216. FIG. 2 also shows system 200B of a second embodiment, which may include the same components of system 200A, however, in this embodiment the RF circuitry 216 may be separate from the modem circuitry 210. Each of the host platform 205, modem circuitry 210, and antennas 219 (and RF circuitry 216 of system 200B) may comprise one or more multi-chip packages (MCPs), each of which may include multiple integrated circuits (ICs), chips, or other like semiconductor devices formed on a single unifying substrate (e.g., a single semiconductor package, a single printed circuit board (PCB), of the like). The following description is provided for examples where the IX circuitry 212, memory circuitry 213, baseband circuitry 214, and RF circuitry 216 as being disposed on a single MCP; however, the example embodiments are not limited in this regard and the described embodiments may apply to other arrangements that may benefit from the principles described herein, such as where the memory circuitry 213, baseband circuitry 214, and/or RF circuitry 216 reside on respective chips or packages.

Host platform 205 may be an MCP that includes processor circuitry 202 and memory circuitry 220, which may act in concert to execute program code to carry out various tasks. The processor circuitry 202 may comprise one or more processing elements configured to perform basic arithmetical, logical, and input/output operations by carrying out instructions. The processor circuitry 202 may include cores 203 and last level cache (LLC) 404. Each of the cores 203 may be a component that includes two or more processing units that read and execute program code. Each core 403 may include hardware components to fetch and decode instructions, schedule instructions for execution, execute the instructions, fetch data for instruction execution, and store data produced by execution of instructions. The LLC 204 may be embodied as a type of cache memory that the processor circuitry 202 can access more quickly than the memory circuitry 220 for storing instructions and/or data for execution. The LLC 204 may be the highest-level cache that is called before accessing memory 104. In some embodiments, the LLC 204 may be an on-die cache, while in other embodiments, the LLC 204 may be an off-die cache that resides on the same IC or SoC as the processor circuitry 202. Although not shown, the processor circuitry 202 may also comprise level (L)1, L2, or L3.

Memory circuitry 220 may be circuitry configured to store data, program code, or logic for operating the system 200. Memory circuitry 220 may include a number of memory devices that may be used to provide for a given amount of system memory. As examples, the memory circuitry 220 can be any suitable type, number and/or combination of volatile memory devices (e.g., random access memory (RAM), dynamic RAM (DRAM), static RAM (SRAM), synchronous DRAM (SDRAM), etc.) and/or non-volatile memory devices (e.g., read-only memory (ROM), EPROM, EEPROM, flash memory, anti-fuses, etc.), that may be configured in any suitable implementation as are known. In various implementations, individual memory devices may be formed of any number of different package types, such as single die package (SDP), dual die package (DDP) or quad die package (Q17P), dual inline memory modules (DIMMs) such as microDIMMs or MiniDIMMs, and/or any other like memory devices.

To provide for persistent storage of information such as data, applications, operating systems and so forth, the memory circuitry 220 may include one or more mass-storage devices, such as a solid state disk drive (SSDD); flash memory cards, such as SD cards, microSD cards, xD picture cards, and the like, and USB flash drives; on-die memory or registers associated with the processor circuitry 202 (for example, in low power implementations); a micro hard disk drive (HDD); three dimensional cross-point (3D XPOINT) memories from Intel® and Micron®, etc.

The IXs (or "links") 206 and 211 may include one or any number (or combination) of interconnect and/or bus technologies used to convey data between host platform 205 and modem circuitry 210. Each IX may include a communications channel between ports of two endpoints (EPs) allowing both of EPs to send and receive configuration, I/O, or memory read/write requests and interrupts. As examples, the IXs 206, 211, and 218 may include Intel® Ultra Path Interface (UPI), Intel® Accelerator Link (IAL), Common Application Programming Interface (CAPI), Intel® Quick-Path Interconnect (QPI), peripheral component interconnect (PCI), PCI express (PCIe), PCI extended (PCIx), RapidIO™ system interconnects, Ethernet, Cache Coherent Interconnect for Accelerators (CCIA), Gen-Z Consortium IXs, Open Coherent Accelerator Processor Interface (OpenCAPI) and/or the like. PCIe is used as an example for IX 206 throughout the present disclosure, however, the embodiments herein should not be construed as limited to using such technologies and the embodiments discussed herein may be applicable to any IX technology or combinations thereof.

Where PCIe is used, each link/IX 206 may be a dual unidirectional differential link implemented as a transmit pair for transmitting signals and a receive pair for receiving signals. A data clock may be embedded using an encoding scheme to achieve very high data rates. Each link may support at least one lane, where each lane represents a set of differential signal pairs (e.g., one pair for transmission and one pair for reception), and each link should support a symmetric number of lanes in each direction (e.g., a ×16 Link indicates there are 16 differential signal pairs in each direction). To scale bandwidth, a link may aggregate multiple lanes denoted by ×N where N may be any of the supported Link widths. An ×8 link operating at the 2.5 GT/s data rate represents an aggregate bandwidth of 20 Gigabits/second (Gbps) of raw bandwidth in each direction. Lane widths may include sizes of ×1, ×2, ×4, ×8, ×12, ×16, and ×32, for example. During hardware initialization, each PCIe IX 206 may be set up following a negotiation of lane widths and frequency of operation by two agents at each end of the link. In some cases, no firmware or operating system software is involved. Once initialized, each PCIe IX 206 may only operate at one supported signaling levels or signaling rates (also referred to as a "data transfer rate" herein). Only one signaling rate is defined for the first generation of PCIe technology, which may provide an effective 2.5 Gbps per lane per direction of raw bandwidth. The second generation of PCIe technology may provide an effective 5.0 Gbps per lane per direction of raw bandwidth, the third generation of PCIe technology may provide an effective 8.0 Gbps per lane per direction of raw bandwidth, and the fourth generation of PCIe technology may provide an effective 16.0 Gbps per lane per direction of raw bandwidth. The data rate is expected to increase with technology advances in the future. Other aspects of the PCIe IX 206 are discussed in more detail in PCI-SIG®, PCI Express® Base Specification Revision 4.0 Version 1.0 (Sep. 27, 2017).

The modem circuitry 210 may include IX interface circuitry 212, baseband circuitry 214, and off-board memory circuitry 213. The modem circuitry 210 may include RF circuitry 216 or the modem circuitry 210 may not include RF circuitry 216. The baseband circuitry 214 and RF circuitry 216 may be the same or similar to the baseband circuitry and RF circuitry discussed with regard to FIGS. 4 and 5, infra. The antennas 219 may be microstrip antennas or printed antennas that are fabricated on the surface of one or more PCBs. The antennas 219 may be formed in as a patch of metal foil (e.g., a patch antenna) in a variety of shapes, and may be coupled with the RF circuitry 216 using metal transmission lines. The antennas 219 may operate in a same or similar manner as discussed infra with regard to FIG. 5.

The IX interface circuitry 212 may couple the host platform 205 with the modem circuitry 210 over the IX 206. In embodiments where the modem circuitry 210 is implemented as a modem card or an expansion card, the IX interface circuitry 212 may comprise a microcontroller or other like device to control data transfers (e.g., host controller, switch or bridge, etc.), as well as pins or slots used to couple the modem circuitry 210 with the host platform 205. The IX interface circuitry 212 may also include on-chip memory circuitry including suitable combinations of erasable programmable read-only memory (EPROM), electrically erasable programmable read-only memory (EEPROM), flash memory, SRAM, anti-fuses, etc., which may be used to buffer data packets to be transferred to the host platform 205 and/or to store program code and/or configuration data for implementing the rate-adaptive data transfer mechanisms discussed herein.

In embodiments where the modem circuitry 210 is mounted to a same PCB as the host platform 205 or is otherwise connected with the host platform 205 via a local bus/IX technology, the IX interface circuitry 212 may comprise the microcontroller or controller, as well as wires used to couple the modem circuitry 210 to the host platform 205 using a suitable through-hole technology (THT), surface-mount technology (SMT), or the like. In some implementations, the IX interface circuitry 212 may be or may include a cache controller or a caching agent (CA). In other implementations, the IX interface circuitry 212 may be a PCIe device or component such as a PCIe root complex (RC) component, a PCIe endpoint (EP) component (e.g., a PCIe-USB host controller), a PCIe RC Integrated EP, a PCIe switch or bridge component, or the like. The IX interface circuitry 212 may implement a steering mechanism to determine which physical lanes of the IX 206 to use based on various criteria such as caching hint(s), data payload size, and link utilization.

The off-chip memory circuitry 213 may be circuitry configured to store data, program code, or logic for operating the modem circuitry 210. The off-chip memory circuitry 213 may include the same or similar memory devices discussed previously with regard to memory circuitry 220. In an example implementation, the off-chip memory circuitry 213 may be a double data rate (DDR) SDRAM circuit (e.g., DDR1, DDR2, DDR3, DDR4, and future DDR implementations) that may operate in conjunction with DDR bus/IX 218. The DDR bus/IX 218 may be any suitable bus or IX technology (such as those discussed herein) that provides for data transfers on both the rising and falling edges of a clock signal. Although DDR is used as an example for the off-chip memory circuitry 213 throughout the present disclosure, the embodiments herein should not be construed as limited to using such technologies and the embodiments discussed herein may be applicable to any type or combination of memory technologies. Additionally, as used herein the term "off-chip memory" may refer to a memory device or circuitry that is integrated in a different IC or SoC than the baseband circuitry 214, and the term "off-board memory" may refer to a memory device or circuitry that mounted on a separate PCB than the baseband circuitry 214. Furthermore, the term "in-package memory" may refer to an off-chip memory device or circuitry that is integrated in a different IC or SoC than the baseband circuitry 214 but is mounted on a same PCB or the same package as the baseband circuitry 214 (e.g., an MCP). However, the terms "off-chip," "off-board," or "in-package" may be used interchangeably throughout the present disclosure unless explicitly stated otherwise.

In some embodiments, the off-chip memory circuitry 213 may store program code for the data-rate adaptive data transfer mechanisms, which may be executed by the IX interface circuitry 212 or baseband circuitry 214 to select different modes of operation in a rate-adaptive manner in transferring data received, demodulated, or otherwise made available (e.g., decoding, deciphering, reordering, filtering, routing, etc.) by the baseband circuitry 214 to the host platform 205. To operate in the rate-adaptive manner, the IX interface circuitry 212 or the baseband circuitry 214 may determine a current data rate of data packets received by the modem circuitry 210 and/or the baseband circuitry 214, and may transfer the data packets to the host platform 205 over the IX 206 at a data transfer rate that is selected based at least in part on the determined data rate. In other embodiments, the logic, program code, etc. for operating the rate-adaptive data transfer scheme may be stored by on-chip memory circuitry of the IX interface circuitry 212 or the baseband circuitry 214, for example, as firmware or the like.

As alluded to previously, the IX interface circuitry 212 may control the transfer of data packets from the modem circuitry 210 to the host platform 205. Typically, the IX interface circuitry 212 or the baseband circuitry 214 may implement a data aggregation scheme (also referred to as a "bundling scheme" or the like) when transferring data to the host platform 205. In other implementations, the baseband circuitry 214 may operate the data aggregation scheme. Such data aggregation schemes may include storing data packets in the off-chip memory circuitry 213 (or in particular buffers or registers of the off-chip memory circuitry 213) as the baseband circuitry 214 demodulates or otherwise converts signals received over-the-air (OTA). While the data packets are stored in the off-chip memory circuitry 213, the IX 206 may be in an "off" state or low power mode. For example, where the IX 206 is a PCIe IX, this "off" state may be the L1.1 or L1.2 state where no power is present in the physical layer (PHY). The IX interface circuitry 212 or baseband circuitry 214 may implement a clock or timer to measure an aggregation period or aggregation interval, during which the data packets are to be stored in the off-chip memory circuitry 213. When the aggregation period expires, the IX interface circuitry 212 or baseband circuitry 214 may read the data packets from the off-chip memory circuitry 213 to a buffer of on-chip memory circuitry, and may send the buffered data to host platform 205 as a data transfer burst (e.g., 1 millisecond (ms) bursts). The "on-chip" memory circuitry may refer to a memory device or circuitry that is integrated in a same IC or SoC as the baseband circuitry 214 or the IX interface circuitry 212. As examples, the on-chip memory circuitry may include static random access memory (SRAM), non-volatile SRAM (nvSRAM), or the like. Prior to sending the buffered data to the host platform 205, the IX interface circuitry 212 may activate the IX 206 or switch the IX 206 to an "on" state. For example, where the IX 206 is a PCIe IX, the "on" state may be the L0 "Active" state. In each of these states, the power supply for the IX 206 may remain active.

The data aggregation scheme may be used to conserve power and/or battery life because the IX 206 may consume a relatively large amount of energy when active or in the "on" state. Such data aggregation schemes may make sense for data transmission rates provided by current Long Term Evolution (LTE) network implementations since the power used to transfer data packets to/from the off-chip memory circuitry 213 is usually less than the power used to keep the IX 206 continuously active. However, such data aggregation schemes only make sense if the IX 206 link is in the "on" state for time that is sufficiently small enough to allow for the IX 206 link activation plus some non-zero inactive time. Using data aggregation schemes for the larger data rates provided by future LTE implementations and/or Fifth Generation (5G) networks may not conserve energy, and in some cases may result in more energy consumption, due to the increased amount of data transfers to the off-chip memory circuitry 213 and switching the IX 206 on and off. These issues are discussed in more detail with respect to FIG. 3.

According to various embodiments, the IX interface circuitry 212 or the baseband circuitry 214 may operate according to a rate-adaptive data transfer scheme, where data packets are transferred to the host platform 205 depending on a current data transmission rate, dynamically determined. As used herein, the term "data transmission rate" or "data Tx rate" may refer to the speed at which data, data packets, or signals are transmitted OTA from one device to another device, such as from a base station to to a user equipment (UE) including the system 200. The terms "data transmission rate" or "data Tx rate" may be used interchangeably with and other like terms such as "data rate," "data signaling rate," "bit rate," "bandwidth," "throughput," or the like, may also be used for this purpose. The term "data transfer rate" may refer to the rate at which data is transferred from the modem circuitry 210 to the host platform 205, or vice versa. In embodiments, different data transmission (Tx) rate thresholds may be used to optimize energy consumption of the IX 206. In some embodiments, the data Tx rate thresholds may be used to select a particular storage device for buffering or otherwise storing data packets to be transferred from the modem circuitry 210 to the host platform 205. In some embodiments, the data Tx rate thresholds may be used to select a particular aggregation period or bundling period length for transferring buffered data packets to the host platform 205. For example, longer aggregation periods may be selected for lower data Tx rates. In some embodiments, the data Tx rate thresholds may be used to select a particular buffering mechanism/procedure (e.g., first-in first-out (FIFO), shortest remaining time first, shortest job first (SJF), fixed priority preemptive scheduling, multi-level queueing, fair share scheduling, and/or the like).

The data rate thresholds may be based on the particular hardware characteristics of the modem circuitry 210, for example, a size of the on-chip memory circuitry (or the size of particular buffers of the on-chip memory circuitry), aggregation (bundling) periods or intervals, link speed(s) of the IX 206, number of lanes or channels of the IX 206, IX 206 link capacity, latency characteristics of the IX 206 (e.g., time required to transition from the "on" state to the "off" state, and vice versa), platform specific power consumption characteristics of the host platform 205 interface, and/or other like hardware characteristics.

In some embodiments, three data rate thresholds or operation modes may be used. In these embodiments, a first mode may be used for low data Tx rates, a second mode may be used for medium data Tx rates, and a third mode may be used for high data Tx rates. In the first mode, data packets may be buffered using the on-chip memory circuitry (e.g., SRAM) and transferred to the host platform 205 during data transfer bursts (e.g., after expiration of a first aggregation period). In the second mode, data packets may be offloaded to the off-chip memory circuitry 213 when the on-chip memory circuitry is full, while in a same or similar manner as the data aggregation schemes discussed previously are used. In the third mode, the IX 206 is left in the "on" state and data packets may be streamed to the host platform 205. The third mode may include using the on-chip memory circuitry to buffer the data packets for transfer to the host platform 205. In some embodiments, the data Tx rate for the third mode may be about 4 Gbps or more, and the data transfer rate for the third mode may be the same or similar to the effective data transfer rate per lane per direction of raw bandwidth depending on the particular IX technology used.

In embodiments, each aggregation period (or bundling period) may be a configuration parameter set by a user, manufacturer of the modem circuitry, or network operator. The particular values assigned to these configuration parameters may be based on various hardware or software implementations of the modem circuitry (e.g., memory circuitry capacity, IX link transfer rate capabilities, baseband processor speeds, etc.), data transmission rate capabilities (e.g., highest potential data transmission rate for a given network, or data rates being limited based on user subscriptions, data plans, or the like), Quality of Service (QoS) requirements, or other like criteria (e.g., such as those discussed previously with regard to the data Tx rate thresholds). In one example, the data Tx rate for the second mode may be about 2 Gbps to about 4 Gbps or the like, and the data transfer rate, data transfer bursts, or aggregation period for the second mode may be 1 ms or 2 ms. In another example, the data Tx rate for the first mode may be about 2 Gbps or less, and the data transfer rate, the data transfer bursts, or aggregation period may be about 512 microseconds (μs) bursts or the like. In yet another example, the data Tx rate for the first mode may be about 2 Gbps or less, and the data transfer rate, the data transfer bursts, or aggregation period may be in a range of approximately 0.5 ms to 4 ms.

While not shown, various other devices may be present within, or connected to, the system 200. For example, the system 200 may also include input/output (I/O) interface circuitry, such as an external expansion bus/cards (e.g., Universal Serial Bus (USB), FireWire, Thunderbolt, etc.), used to connect system 200 with external (peripheral) components/devices. This circuitry may include any suitable interface controllers and connectors to couple the system 110 with the external components/devices. In another example, I/O devices, such as a display, a touchscreen, or keypad, may be connected to the system 200 to accept input and display outputs.

Figure 3:
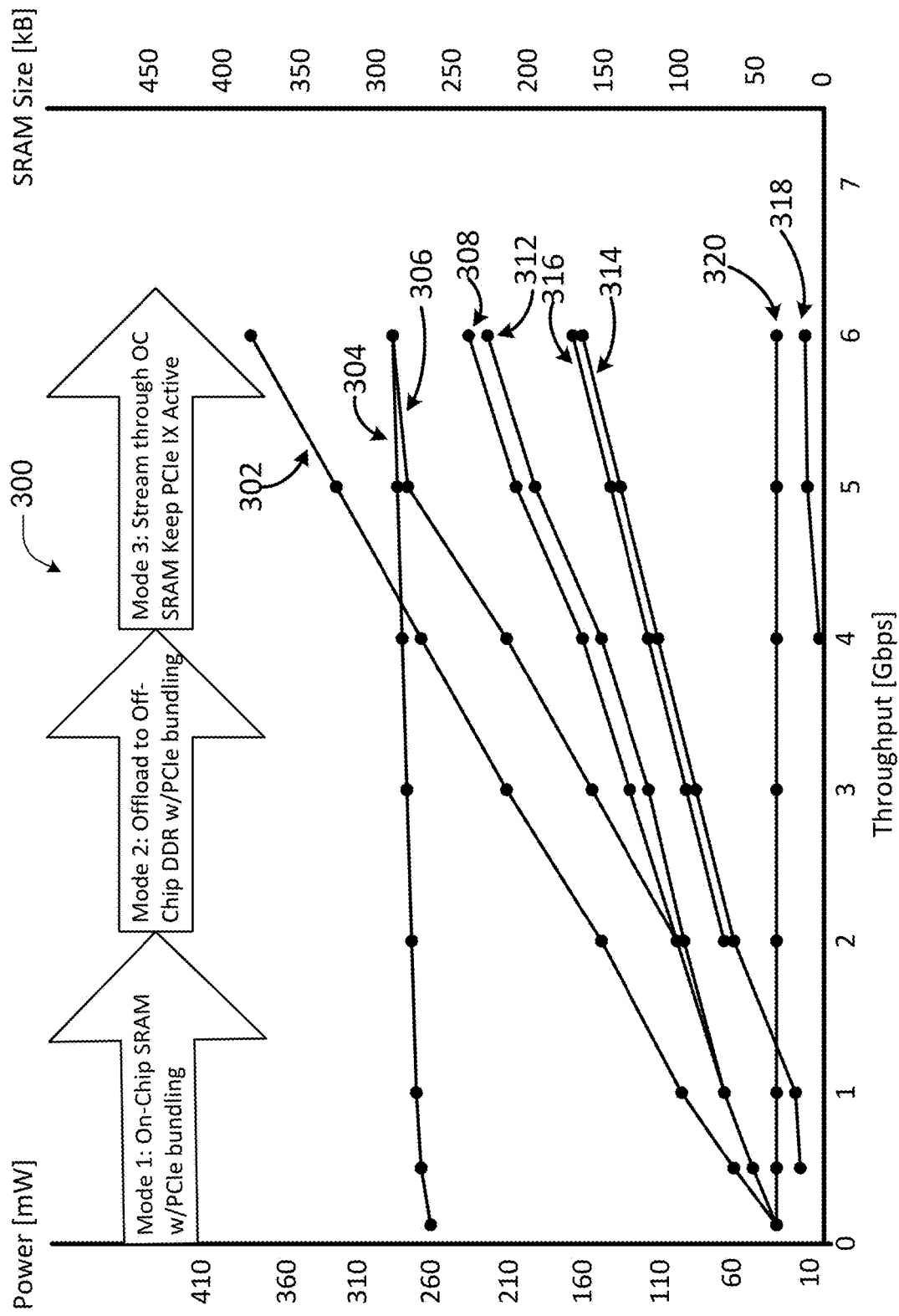
FIG. 3 illustrates a graph showing throughput versus power versus memory size.

FIG. 3 illustrates a graph 300 showing throughput versus power versus memory size. The graph 300 shows an example results of a rate-adaptive optimized power consumption, which is represented by plot line 306. The plot line 306 may represent transport related power consumption of an example implementation of the modem circuitry 210 discussed previously. The example implementation may be based on a modem model that comprises IX interface circuitry 212 including a modem PCIe End Point (physical layer (PHY) only) and a PCIe Root Port (PHY only), off-chip capacitive DDR (CP-DDR) memory circuitry 213, and on-chip SRAM memory circuitry.

In this example, three modes or data Tx rate thresholds were used including mode 1 where data packets were streamed through the on-chip SRAM memory circuitry and bundled for transfer to the host platform 205; mode 2 were data packets were offloaded to the off-chip DDR memory circuitry 213 and bundled for transfer to the host platform 205; and mode 3 where the data packets were streamed through the on-chip SRAM circuitry while the PCIe IX 206 remained active or in the "on" state. The various thresholds used in this example for mode 1, mode 2, and mode 3 are based on the dimensions of the individual components of the modem model. In other implementations, different modes and/or thresholds may be used depending on the modem circuitry 205 characteristics, such a size or amount of the on-chip memory circuitry resources, a size or amount of the off-chip memory circuitry 213 resources, bundling/aggregation periods, IX/link speed, the power consumption characteristics of the host interface, and/or other like characteristics.

In graph 300, the plot line 302 is a consumption profile of delivery via the off-chip DDR memory; plot line 304 represents a consumption profile of data packet delivery while keeping the PCIe IX 206 active; plot line 306 represents a consumption profile of the rate-adaptive delivery scheme of the embodiments discussed herein; plot line 308 represents a consumption profile using data packet delivery via the on-chip SRAM; profile 312 represents power consumption using PCIe bundling; plot line 314 represents the read/write (R/W) power consumption of the off-chip DDR memory circuitry 213; plot line 316 represents the power consumption of an active PCIe IX 206; plot line 318 represents the R/W power consumption of the on-chip SRAM; and plot line 320 represents the power consumption of the PCIe Recovery Power.

Initially, at low data rates the plot line 306 of the optimized profile follows plot line 308, which represents delivery by streaming through the on-chip SRAM and activating the PCIe IX as per aggregation period of 512 microseconds (μs), for example. In mode 1, the minimum power may be consumed to transport data from the modem circuitry 210 to the host platform 205. The size of the on-chip SRAM and the bundling interval may be used to determine the maximum data Tx rate that can be sustained in this mode of operation, which is at or below 2 Gbps in this example. The particular product cost considerations may lead to a maximum SRAM size dimensioning of 128 kB, for example. Mode 1 may be used for relatively low throughput scenarios, which may involve various practical use cases such as Short Message Service (SMS)/Multimedia Messaging Service (MMS) signaling, web browsing, media (e.g., audio or video) streaming, Voice over LTE (VoLTE), background data transfers of limited bandwidth (e.g., for authentication or identity verification procedures), for user subscriptions that do not allow for high data rates, or the like.

When the internal buffering resources (e.g., the storage resources of the on-chip SRAM circuitry) cannot accommodate data as per the bundling interval of mode 1, the modem circuitry 210 may enter mode 2. In this example, the internal buffering resources of the on-chip SRAM memory circuitry may be exceeded at data Tx rates above 2 Gbps. In mode 2, excessive data may start to be offloaded to off-chip DDR memory circuitry 213. In this way, additional power may be consumed such that the overall power may increase in a similar manner as with plot line 302 where the data packets would otherwise traverse the CP-DDR memory circuitry 213 as in prior modem implementations.

As the data Tx rate further increases, in this example at or beyond 4 Gbps, the power for offloading to off-chip DDR memory circuitry 213 (e.g., as shown by plot line 302) may begin to dominate over the power consumption of the delivery keeping the PCIe IX 206 active (e.g., as shown by plot line 304). Therefore, when this threshold is crossed, the modem circuitry 205 may enter mode 3 where the PCIe IX 206 may be kept active, and the data packets to be written to the host platform 205 may be read from the on-chip SRAM circuitry and offloaded via the PCIe IX 206 directly to a destination from the modem perspective in host memory. By adjusting or altering the data transfer scheme according to the data transfer rate in this way, data transfer related power consumption may be reduced, especially considering the restricted on-chip memory circuitry resource budget.

Figure 4:
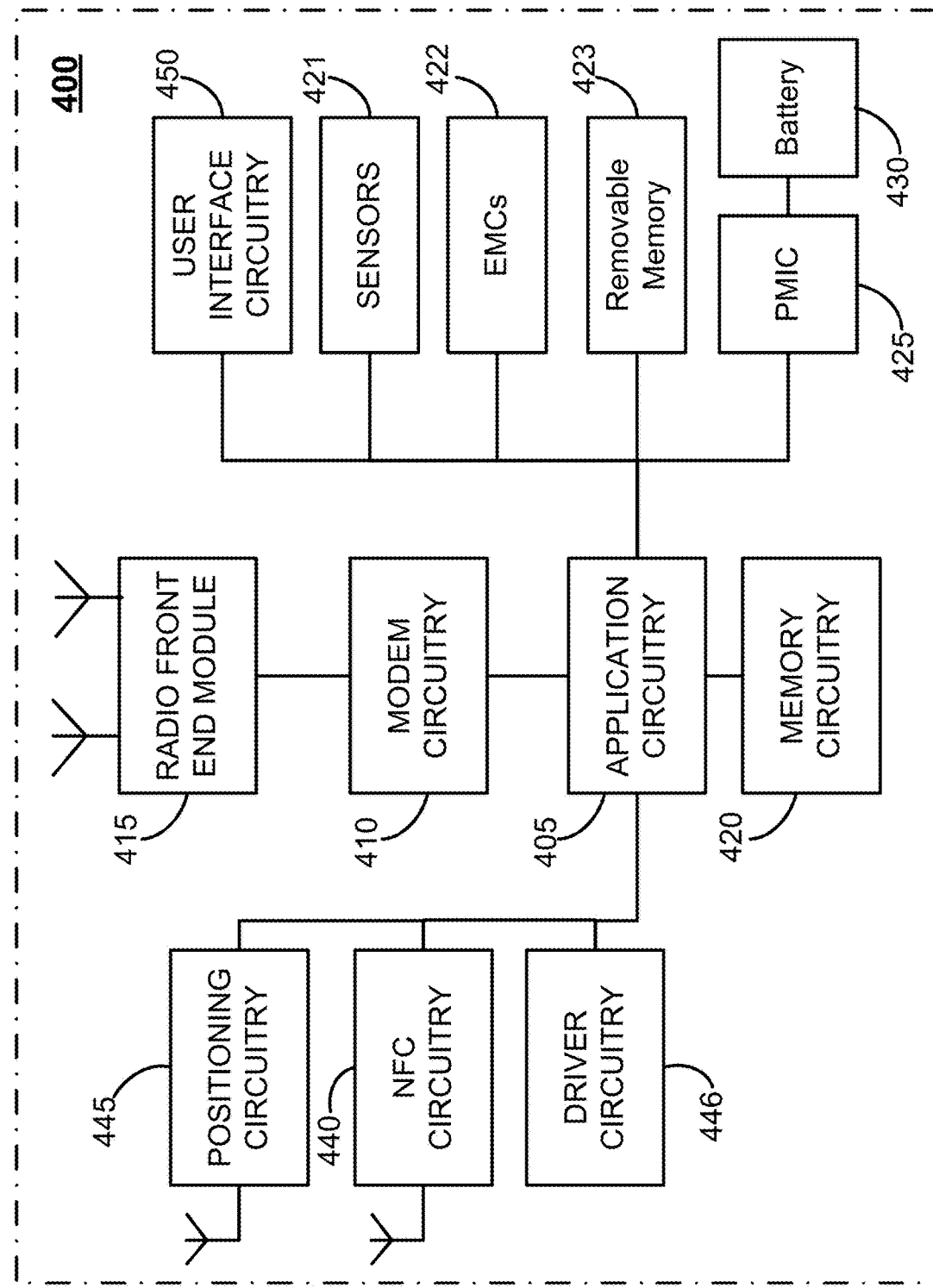
FIG. 4 depicts example components of a computer platform in accordance with some embodiments.

FIG. 4 illustrates an example of a platform 400 (or "device 400") in accordance with various embodiments. In embodiments, the computer platform 400 may be suitable for use as UEs 105, server(s) 110, and/or any other element/device discussed herein. The platform 400 may include any combinations of the components shown in the example. The components of platform 400 may be implemented as integrated circuits (ICs), portions thereof, discrete electronic devices, or other modules, logic, hardware, software, firmware, or a combination thereof adapted in the computer platform 400, or as components otherwise incorporated within a chassis of a larger system. The block diagram of FIG. 4 is intended to show a high level view of components of the computer platform 400. However, some of the components shown may be omitted, additional components may be present, and different arrangement of the components shown may occur in other implementations.

The application circuitry 405 may include circuitry such as, but not limited to, single-core or multi-core processors and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (TO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 400.

Application circuitry 405 may be or may include a microprocessor, a multi-core processor, a multithreaded processor, an ultra-low voltage processor, an embedded processor, one or more graphics processing units (GPUs), or other known processing element or processing/controlling circuit(s). As examples, the application circuitry 405 may include an Intel® Architecture Core™ based processor, such as a Quark™, an Atom™, an i3, an i5, an i7, or an MCU-class processor, or another such processor available from Intel® Corporation, Santa Clara, Calif.; one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry 405 may be a part of a system on a chip (SoC) in which the application circuitry 405 and other components are formed into a single integrated circuit, or a single package, such as the Edison™ or Galileo™ SoC boards from Intel® Corporation. In embodiments where the application circuitry is to act as a network element, server, or the like (e.g., system 110 of FIG. 1), the processors of application circuitry 405 may process IP data packets received from an Evolved Packet Core (EPC) or Fifth Generation Core (5GC) network. In embodiments where the application circuitry is to act as a mobile computer device (e.g., UEs 105 of FIG. 1), the application circuitry 405 may operate in a same or similar manner as the host platform 205 discussed previously with regard to FIG. 2.

Additionally or alternatively, application circuitry 405 may include circuitry such as, but not limited to, one or more field-programmable device (FPD) (e.g., a field-programmable gate array (FPGA), a programmable logic device (PLD), a complex PLD (CPLD), a high-capacity PLD (HCPLD), a structured ASIC, a programmable System on Chip (SoC), or the like. In such embodiments, the circuitry of application circuitry 405 may comprise logic blocks or logic fabric including other interconnected resources that may be programmed to perform various functions, such as the procedures, methods, functions, etc. of the various embodiments discussed herein. In such embodiments, the circuitry of application circuitry 4105 may include memory cells (e.g., erasable programmable read-only memory (EPROM), electrically erasable programmable read-only memory (EEPROM), flash memory, static memory (e.g., SRAM, anti-fuses, etc.)) used to store logic blocks, logic fabric, data, etc. in lookup-tables (LUTs) and the like.

The modem circuitry 410 may be implemented, for example, as a solder-down substrate including one or more integrated circuits, a single packaged integrated circuit soldered to a main circuit board or a multi-chip module containing two or more integrated circuits. Although not shown, baseband circuitry 410 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NoC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, modem circuitry 410 may include protocol processing circuitry with one or more instances of control circuitry (not shown) to provide control functions for the digital baseband circuitry and/or radio frequency circuitry (for example, the radio front end modules 415). In embodiments, the modem circuitry 410 may correspond to the modem circuitry 210 discussed previously with regard to FIG. 2.

The radio front end modules (RFEMs) 415 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays (e.g., antennas 219 discussed previously or antennas 519 discussed infra), and the RFEM may be connected to multiple antennas. In alternative implementations, both millimeter wave and sub-millimeter wave radio functions may be implemented in the same physical RFEM 415. The RFEMs 415 may incorporate both millimeter wave antennas and sub-millimeter wave antennas.

The memory circuitry 420 may include any number and type of memory devices used to provide for a given amount of system memory. As examples, the memory circuitry 420 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 420 may be developed in accordance with a Joint Electron Devices Engineering Council (JEDEC) low power double data rate (LPDDR)-based design, such as LPDDR2, LPDDR3, LPDDR4, or the like. Memory circuitry 420 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 420 may be on-die memory or registers associated with the application circuitry 405. To provide for persistent storage of information such as data, applications, operating systems and so forth, memory circuitry 420 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 400 may incorporate the three-dimensional (3D) cross-point (XPOINT) memories from Intel® and Micron®. In embodiments, the memory circuitry 420 and/or the application circuitry 405 may correspond to the host platform 205 discussed previously with regard to FIG. 2.

Removable memory circuitry 423 may include devices, circuitry, enclosures/housings, ports or receptacles, etc. used to coupled portable data storage devices with the platform 400. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 400 may also include interface circuitry (not shown) that is used to connect external devices with the platform 400. The external devices connected to the platform 400 via the interface circuitry may include sensors 421, such as accelerometers, level sensors, flow sensors, temperature sensors, pressure sensors, barometric pressure sensors, and the like. The interface circuitry may be used to connect the platform 400 to electro-mechanical components (EMCs) 422, which may allow platform 400 to change its state, position, and/or orientation, or move or control a mechanism or system. The EMCs 422 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 400 may be configured to operate one or more EMCs 422 based on one or more captured events and/or instructions or control signals received from a service provider and/or various clients.

In some implementations, the interface circuitry may connect the platform 400 with positioning circuitry 445. The positioning circuitry 445 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 445) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 445 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry 445 may provide data to application circuitry 405, which may include one or more of position data or time data. Application circuitry 405 may use the time data to synchronize operations with one or more radio base stations.

In some implementations, the interface circuitry may connect the platform 400 with near-field communication (NFC) circuitry 440, which may include an NFC controller coupled with an antenna element and a processing device. The NFC circuitry 440 may be configured to read electronic tags and/or connect with another NFC-enabled device.

The driver circuitry 446 may include software and hardware elements that operate to control particular devices that are embedded in the platform 400, attached to the platform 400, or otherwise communicatively coupled with the platform 400. The driver circuitry 446 may include individual drivers allowing other components of the platform 400 to interact or control various input/output (I/O) devices that may be present within, or connected to, the platform 400. For example, driver circuitry 446 may include a display driver to control and allow access to a display device, a touchscreen driver to control and allow access to a touchscreen interface of the platform 400, sensor drivers to obtain sensor readings of sensors 421 and control and allow access to sensors 421, EMC drivers to obtain actuator positions of the EMCs 422 and/or control and allow access to the EMCs 422, a camera driver to control and allow access to an embedded image capture device, audio drivers to control and allow access to one or more audio devices.

The power management integrated circuitry (PMIC) 425 (also referred to as "power management circuitry 425") may manage power provided to various components of the platform 400. In particular, with respect to the modem circuitry 410, the PMIC 425 may control power-source selection, voltage scaling, battery charging, or DC-to-DC conversion. The PMIC 425 may often be included when the platform 400 is capable of being powered by a battery 430, for example, when the device is included in a UE 105.

In some embodiments, the PMIC 425 may control, or otherwise be part of, various power saving mechanisms of the platform 400. For example, if the platform 400 is in an RRC_Connected state, where it is still connected to the RAN node as it expects to receive traffic shortly, then it may enter a state known as Discontinuous Reception Mode (DRX) after a period of inactivity. During this state, the platform 400 may power down for brief intervals of time and thus save power. If there is no data traffic activity for an extended period of time, then the platform 400 may transition off to an RRC_Idle state, where it disconnects from the network and does not perform operations such as channel quality feedback, handover, etc. The platform 400 goes into a very low power state and it performs paging where again it periodically wakes up to listen to the network and then powers down again. The platform 400 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 430 may power the platform 400, although in some examples the platform 400 may be mounted deployed in a fixed location, and may have a power supply coupled to an electrical grid. The battery 430 may be a lithium ion battery, a metal-air battery, such as a zinc-air battery, an aluminum-air battery, a lithium-air battery, and the like. In some implementations, such as in V2X applications, the battery 430 may be a typical lead-acid automotive battery.

In some implementations, the battery 430 may be a "smart battery," which includes or is coupled with a Battery Management System (BMS) or battery monitoring integrated circuitry. The BMS may be included in the platform 400 to track the state of charge (SoCh) of the battery 430. The BMS may be used to monitor other parameters of the battery 430 to provide failure predictions, such as the state of health (SoH) and the state of function (SoF) of the battery 430. The BMS may communicate the information of the battery 430 to the application circuitry 405 or other components of the platform 400. The BMS may also include an analog-to-digital (ADC) convertor that allows the application circuitry 405 to directly monitor the voltage of the battery 430 or the current flow from the battery 430. The battery parameters may be used to determine actions that the platform 400 may perform, such as transmission frequency, network operation, sensing frequency, and the like.

A power block, or other power supply coupled to an electrical grid may be coupled with the BMS to charge the battery 430. In some examples, the power block may be replaced with a wireless power receiver to obtain the power wirelessly, for example, through a loop antenna in the computer platform 400. In these examples, a wireless battery charging circuit may be included in the BMS. The specific charging circuits chosen may depend on the size of the battery 430, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 400 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an $I^2C$ interface, an SPI interface, point to point interfaces, and a power bus, among others.

Figure 5:
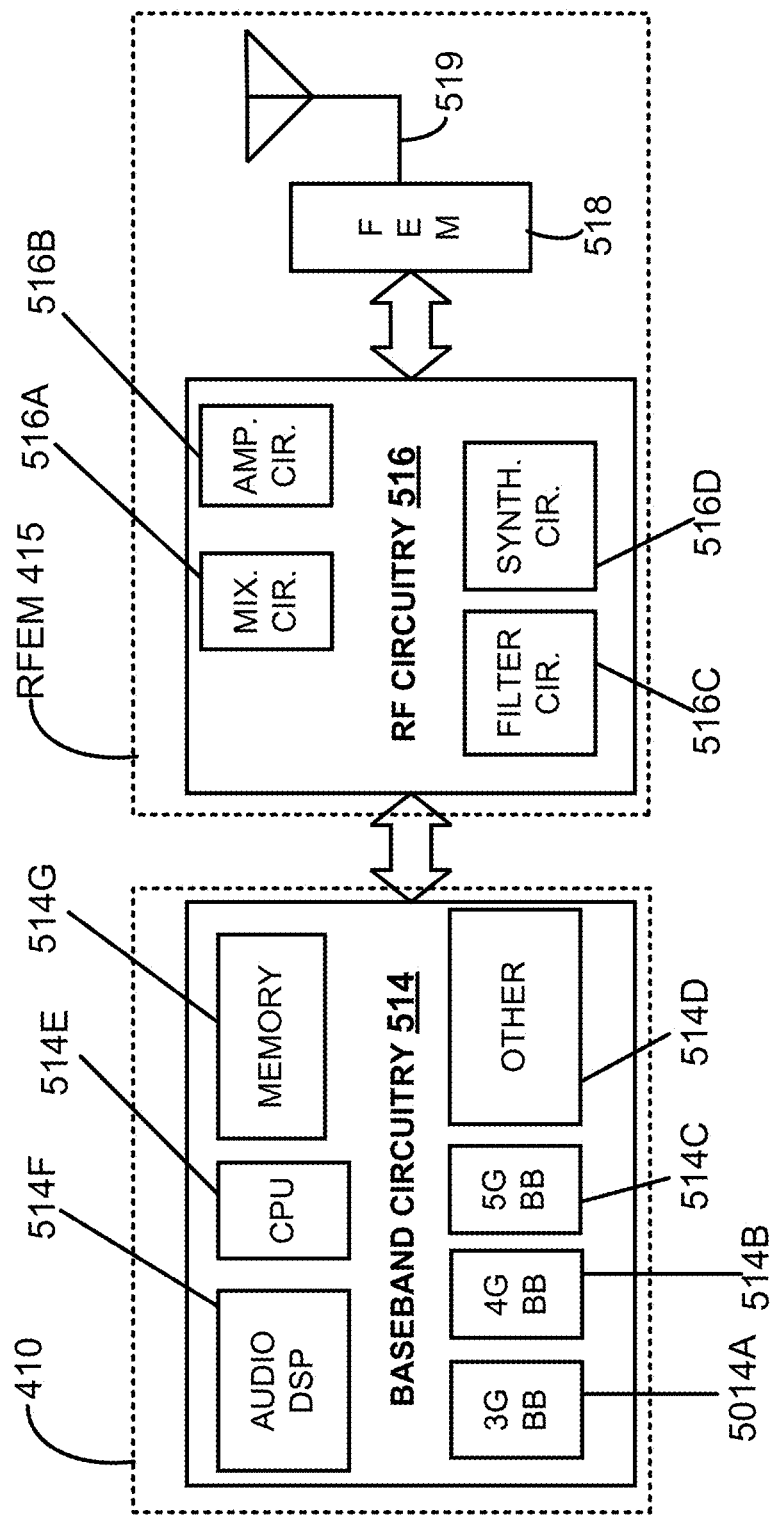
FIG. 5 depicts example components of baseband circuitry and radio frequency circuitry in accordance with some embodiments.

FIG. 5 illustrates example components of modem circuitry 410 and RFEM 415 in accordance with some embodiments. As shown, the modem circuitry 410 may include baseband circuitry 514 and the RFEM 415 may include Radio Frequency (RF) circuitry 516, front-end module (FEM) circuitry 518, one or more antennas 519 coupled together at least as shown.

The baseband circuitry 514 may include circuitry such as, but not limited to, one or more single-core or multi-core processors. The baseband circuitry 514 may include one or more baseband processors or control logic to process baseband signals received from a receive signal path of the RF circuitry 516 and to generate baseband signals for a transmit signal path of the RF circuitry 516. The baseband circuitry 514 may interface with the application circuitry 405 for generation and processing of the baseband signals and for controlling operations of the RF circuitry 516. For example, in some embodiments, the baseband circuitry 514 may include a third generation (3G) baseband processor 514A, a fourth generation (4G) baseband processor 514B, a fifth generation (5G) baseband processor 514C, or other baseband processor(s) 514D for other existing generations, generations in development or to be developed in the future (e.g., second generation (2G), sixth generation (6G), etc.). The baseband circuitry 514 (e.g., one or more of baseband processors 514A-D) may handle various radio control functions that enable communication with one or more radio networks via the RF circuitry 516. In other embodiments, some or all of the functionality of baseband processors 514A-D may be included in modules stored in the memory 514G and executed via a Central Processing Unit (CPU) 514E. In some embodiments, the memory 514G may correspond to the "on-chip memory circuitry" discussed previously. In such embodiments, the memory 514G may be used to buffer data packets to be transferred to the host platform 205 discussed previously. The radio control functions may include, but are not limited to, signal modulation/demodulation, encoding/decoding, radio frequency shifting, etc. In some embodiments, modulation/demodulation circuitry of the baseband circuitry 514 may include Fast-Fourier Transform (FFT), precoding, or constellation mapping/demapping functionality. In some embodiments, encoding/decoding circuitry of the baseband circuitry 514 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 514 may include one or more audio digital signal processor(s) (DSP) 514F. The audio DSP(s) 514F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 40 and the application circuitry 405 may be implemented together such as, for example, on a system on a chip (SoC).

In some embodiments, the baseband circuitry 514 may provide for communication compatible with one or more radio technologies. For example, in some embodiments, the baseband circuitry 514 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 514 is configured to support radio communications of more than one wireless protocol may be referred to as multi-mode baseband circuitry.

As discussed above, the baseband circuitry 514 may comprise baseband processors 514A-514E and a memory 514G utilized by said baseband processors. Each of the processors 514A-514E may include a respective memory interface to send/receive data to/from the memory 514G. In addition, the baseband circuitry 514 may further include one or more interfaces to communicatively couple to other circuitries/devices, such as a memory interface (e.g., an interface to send/receive data to/from memory external to the baseband circuitry 514 such as memory circuitry 420 and/or removable memory 423 of platform 400), an application circuitry interface (e.g., an interface to send/receive data to/from the application circuitry 405 of platform 400), an RF circuitry interface (e.g., an interface to send/receive data to/from RF circuitry 516), a wireless hardware connectivity interface (e.g., an interface to send/receive data to/from Near Field Communication (NFC) components, Bluetooth® components (e.g., Bluetooth® Low Energy), Wi-Fi® components, user interface circuitry 450 of platform 400, sensors 421 of platform 400, EMCs 422 of platform 400, and/or other communication components), and a power management interface (e.g., an interface to send/receive power or control signals to/from the PMIC 425 of platform 400).

RF circuitry 516 may enable communication with wireless networks using modulated electromagnetic radiation through a non-solid medium. In various embodiments, the RF circuitry 516 may include switches, filters, amplifiers, etc. to facilitate the communication with the wireless network. RF circuitry 516 may include a receive signal path which may include circuitry to down-convert RF signals received from the FEM circuitry 518 and provide baseband signals to the baseband circuitry 514. RF circuitry 516 may also include a transmit signal path which may include circuitry to up-convert baseband signals provided by the baseband circuitry 514 and provide RF output signals to the FEM circuitry 518 for transmission.

In some embodiments, the receive signal path of the RF circuitry 516 may include mixer circuitry 516a, amplifier circuitry 516b and filter circuitry 516c. In some embodiments, the transmit signal path of the RF circuitry 516 may include filter circuitry 516c and mixer circuitry 516a. RF circuitry 516 may also include synthesizer circuitry 516d for synthesizing a frequency for use by the mixer circuitry 516a of the receive signal path and the transmit signal path. In some embodiments, the mixer circuitry 516a of the receive signal path may be configured to down-convert RF signals received from the FEM circuitry 518 based on the synthesized frequency provided by synthesizer circuitry 516d. The amplifier circuitry 516b may be configured to amplify the down-converted signals and the filter circuitry 516c may be a low-pass filter (LPF) or band-pass filter (BPF) configured to remove unwanted signals from the down-converted signals to generate output baseband signals. Output baseband signals may be provided to the baseband circuitry 514 for further processing. In some embodiments, the output baseband signals may be zero-frequency baseband signals, although this is not a requirement. In some embodiments, mixer circuitry 516*a* of the receive signal path may comprise passive mixers, although the scope of the embodiments is not limited in this respect.

In some embodiments, the mixer circuitry 516*a* of the transmit signal path may be configured to up-convert input baseband signals based on the synthesized frequency provided by the synthesizer circuitry 516*d* to generate RF output signals for the FEM circuitry 518. The baseband signals may be provided by the baseband circuitry 514 and may be filtered by filter circuitry 516*c*.

In some embodiments, the mixer circuitry 516*a* of the receive signal path and the mixer circuitry 516*a* of the transmit signal path may include two or more mixers and may be arranged for quadrature downconversion and upconversion, respectively. In some embodiments, the mixer circuitry 516*a* of the receive signal path and the mixer circuitry 516*a* of the transmit signal path may include two or more mixers and may be arranged for image rejection (e.g., Hartley image rejection). In some embodiments, the mixer circuitry 516*a* of the receive signal path and the mixer circuitry 516*a* may be arranged for direct downconversion and direct upconversion, respectively. In some embodiments, the mixer circuitry 516*a* of the receive signal path and the mixer circuitry 516*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 516 may include analog-to-digital converter (ADC) and digital-to-analog converter (DAC) circuitry and the baseband circuitry 514 may include a digital baseband interface to communicate with the RF circuitry 516. In some dual-mode embodiments, a separate radio IC circuitry may be provided for processing signals for each spectrum, although the scope of the embodiments is not limited in this respect. In some embodiments, the synthesizer circuitry 516*d* may be a fractional-N synthesizer or a fractional N/N+1 synthesizer, although the scope of the embodiments is not limited in this respect as other types of frequency synthesizers may be suitable. For example, synthesizer circuitry 516*d* may be a delta-sigma synthesizer, a frequency multiplier, or a synthesizer comprising a phase-locked loop with a frequency divider.

The synthesizer circuitry 516*d* may be configured to synthesize an output frequency for use by the mixer circuitry 516*a* of the RF circuitry 516 based on a frequency input and a divider control input. In some embodiments, the synthesizer circuitry 516*d* may be a fractional N/N+1 synthesizer.

In some embodiments, frequency input may be provided by a voltage controlled oscillator (VCO), although that is not a requirement. Divider control input may be provided by either the baseband circuitry 514 or the application circuitry 405 depending on the desired output frequency. In some embodiments, a divider control input (e.g., N) may be determined from a look-up table based on a channel indicated by the application circuitry 405.

Synthesizer circuitry 516*d* of the RF circuitry 516 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 516*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 516 may include an IQ/polar converter.

FEM circuitry 518 may include a receive signal path which may include circuitry configured to operate on RF signals received from one or more antennas 519, amplify the received signals and provide the amplified versions of the received signals to the RF circuitry 516 for further processing. FEM circuitry 518 may also include a transmit signal path which may include circuitry configured to amplify signals for transmission provided by the RF circuitry 516 for transmission by one or more of the one or more antennas 519. In various embodiments, the amplification through the transmit or receive signal paths may be done solely in the RF circuitry 516, solely in the FEM 518, or in both the RF circuitry 516 and the FEM 518.

In some embodiments, the FEM circuitry 518 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 516). The transmit signal path of the FEM circuitry 518 may include a power amplifier (PA) to amplify input RF signals (e.g., provided by RF circuitry 516), and one or more filters to generate RF signals for subsequent transmission (e.g., by one or more of the one or more antennas 519).

Processors of the application circuitry 405 and processors of the baseband circuitry 514 may be used to execute elements of one or more instances of a protocol stack. For example, processors of the baseband circuitry 514, alone or in combination, may be used execute Layer 3, Layer 2, or Layer 1 functionality, while processors of the baseband circuitry 514 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer and a Non-Access Stratum (NAS) layer; Layer 2 may comprise a medium access control (MAC) layer, a radio link control (RLC) layer, and a packet data convergence protocol (PDCP) layer; and Layer 1 may comprise a physical (PHY) layer of a UE/Radio Access Network (RAN) node.

FIGS. 6-9 illustrate processes 600-900, respectively, in accordance with various embodiments. For illustrative purposes, the operations of processes 600-900 are described as being performed by IX interface circuitry 212 discussed with regard to FIGS. 2-5 however, other entities, modules, components, devices (or components thereof) may operate the processes 600-900 in a multitude of implementations, arrangements, and/or environments. For example, in some embodiments, the baseband circuitry 514 of FIG. 5 may operate the processes 600-900. Additionally, processes 600-900 may be implemented as program code, which when executed by one or more processors, may cause computer system or platform to perform the various operations of processes 600-900. While particular examples and orders of operations are illustrated by FIGS. 6-9, in various embodiments, these operations may be re-ordered, separated into additional operations, combined, or omitted altogether.

Figure 6:
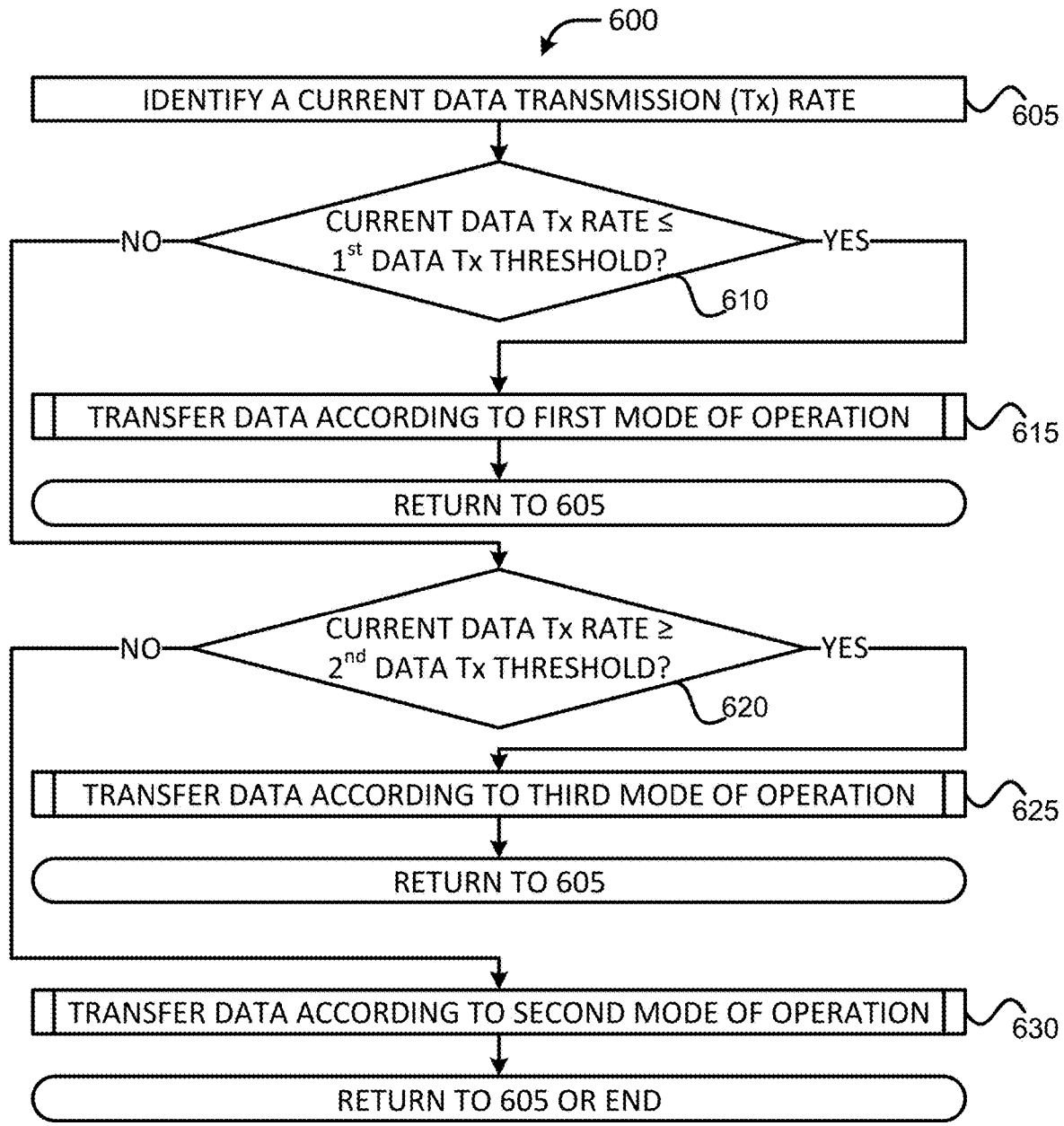
FIG. 6 depicts an example rate-adaptive data transfer process in accordance with various embodiments.

FIG. 6 shows a rate-adaptive data transfer process 600, in accordance with various embodiments. Process 600 may begin at operation 605 where the IX interface circuitry 212 may identify a current data transmission (Tx) rate. At operation 610, the IX interface circuitry 212 may determine whether the current data Tx rate is less than or equal to a first data Tx rate threshold. If at operation 610 the IX interface circuitry 212 determines that the current data Tx rate is less than or equal to a first data Tx rate threshold, then the IX interface circuitry 212 may proceed to operation 615 to transfer data packets to the host platform 205 according to a first mode of operation. The first data Tx rate threshold may be a "low" data Tx rate, as compared to the other data Tx rate discussed infra. The first mode of operation is discussed in more detail infra with respect to FIG. 7. After operation 615, the IX interface circuitry 212 may proceed back to operation 605 to identify the current data Tx rate.

If at operation 610 the IX interface circuitry 212 determines that the current data Tx rate is not less than or equal to a first data Tx rate threshold, then the IX interface circuitry 212 may proceed to operation 620 to determine whether the current data Tx rate is greater than or equal to a second data Tx rate threshold.

At operation 620, the IX interface circuitry 212 may determine whether the current data Tx rate is greater than or equal to a second data Tx rate threshold. If at operation 620 the IX interface circuitry 212 determines that the current data Tx rate is greater than or equal to a second data Tx rate threshold, then the IX interface circuitry 212 may proceed to operation 625 to transfer data packets to the host platform 205 according to a third mode of operation. The second data Tx rate threshold may be a high data Tx rate, as compared to the low data Tx rate of the first data Tx rate threshold. The third mode of operation is discussed in more detail infra with respect to FIG. 9. After operation 625, the IX interface circuitry 212 may proceed back to operation 605 to identify the current data Tx rate.

If at operation 620 the IX interface circuitry 212 determines that the current data Tx rate is not greater than or equal to the second data Tx rate threshold, then the IX interface circuitry 212 may proceed to operation 630 to transfer data packets to the host platform 205 according to a second mode of operation. In this case, the current data Tx rate may be a medium data Tx rate (or a range of data Tx rates considered to be "medium") since the current data Tx rate is somewhere between the first data Tx rate threshold and the second data Tx rate threshold. The second mode of operation is discussed in more detail infra with respect to FIG. 8. After operation 630, the IX interface circuitry 212 may proceed back to operation 605 to identify the current data Tx rate, or the process 600 may end.

Figure 7:
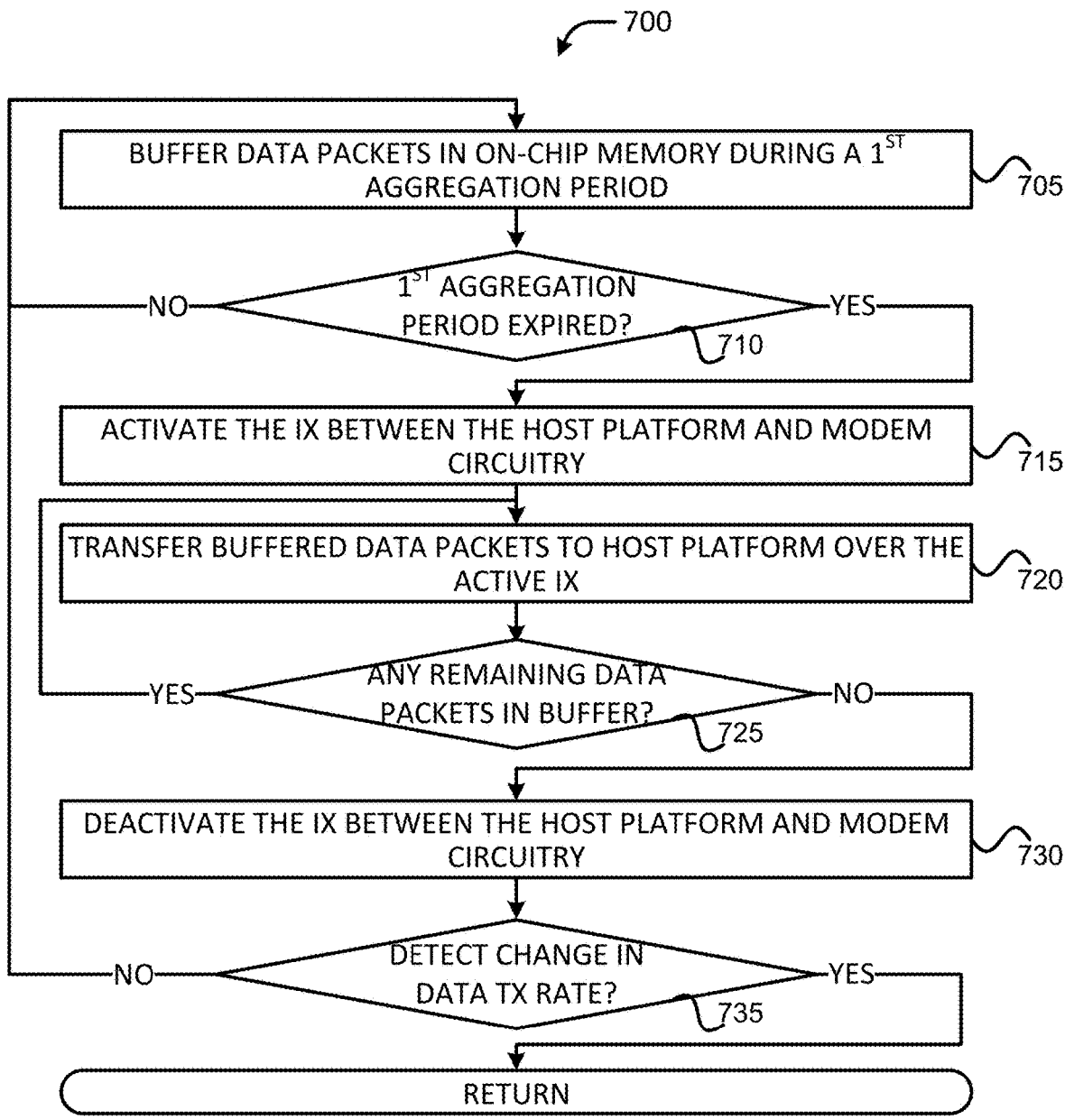
FIG. 7 depicts an example data transfer process of a first mode of operation, in accordance with various embodiments.

FIG. 7 shows a data transfer process 700 of a first mode of operation, in accordance with various embodiments. Process 700 may correspond with operation 615 of process 600 discussed previously. Process 700 may begin at operation 705 where the IX interface circuitry 212 may buffer data packets in on-chip memory circuitry during a first aggregation period. At operation 710, the IX interface circuitry 212 may determine whether the first aggregation period has expired. If at operation 710 the IX interface circuitry 212 determines that the first aggregation period has not expired, the IX interface circuitry 212 may proceed back to operation 705 to continue to buffer data packets in the on-chip memory circuitry.

If at operation 710 the IX interface circuitry 212 determines that the first aggregation period has expired, the IX interface circuitry 212 may proceed to operation 715 to activate the IX 206 between the host platform 205 and the IX interface circuitry 212. At operation 720, the IX interface circuitry 212 may transfer the buffered data packets to the host platform 205 over the active IX 206.

At operation 725, the IX interface circuitry 212 may determine whether there are any remaining data packets in the on-chip memory circuitry. If at operation 725 the IX interface circuitry 212 determines that there are remaining data packets in the on-chip memory circuitry, the IX interface circuitry 212 may proceed back to operation 720 to continue to buffer transfer the buffered data packets to the host platform 205.

If at operation 725 the IX interface circuitry 212 determines that there are no remaining data packets in the on-chip memory circuitry, the IX interface circuitry 212 may proceed to operation 730 to deactivate the IX 206, and may then proceed to operation 735 to determine whether a change in the data Tx rate has changed. If at operation 735 the IX interface circuitry 212 determines that there has not been a detected change in the data Tx rate, the IX interface circuitry 212 may proceed back to operation 705 to buffer data packets in the on-chip memory circuitry. If at operation 735 the IX interface circuitry 212 determines that a change in the data Tx rate has been detected, the IX interface circuitry 212 may return back to process 600 (e.g., operation 615).

Figure 8:
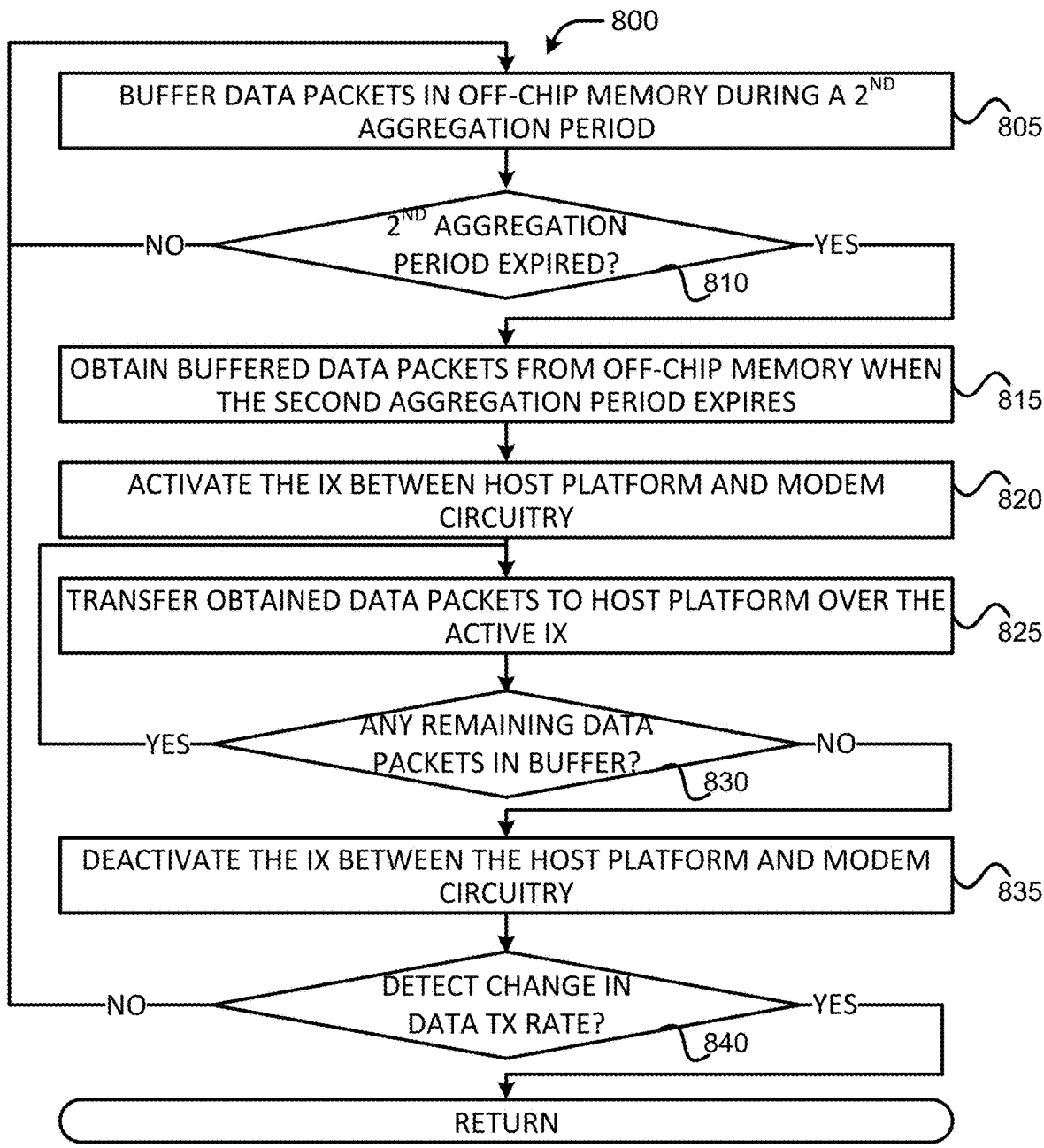
FIG. 8 depicts an example data transfer process of a second mode of operation, in accordance with various embodiments.

FIG. 8 shows a data transfer process 800 of a second mode of operation, in accordance with various embodiments. Process 800 may correspond with operation 625 of process 600 discussed previously. Process 800 may begin at operation 805 where the IX interface circuitry 212 may buffer data packets in off-chip memory circuitry 213 during a second aggregation period. At operation 810, the IX interface circuitry 212 may determine whether the second aggregation period has expired. If at operation 810 the IX interface circuitry 212 determines that the second aggregation period has not expired, the IX interface circuitry 212 may proceed back to operation 805 to continue to buffer data packets in the off-chip memory circuitry 213.

If at operation 810 the IX interface circuitry 212 determines that the second aggregation period has expired, the IX interface circuitry 212 may proceed to operation 815 to obtain buffered data packets from the off-chip memory circuitry 213, and at operation 820 the IX interface circuitry 212 may activate the IX 206 between the host platform 205 and the IX interface circuitry 212. At operation 825, the IX interface circuitry 212 may transfer the obtained data packets to the host platform 205 over the active IX 206.

At operation 830, the IX interface circuitry 212 may determine whether there are any remaining data packets in the off-chip memory circuitry 213. If at operation 830 the IX interface circuitry 212 determines that there are remaining data packets in the off-chip memory circuitry 213, the IX interface circuitry 212 may proceed back to operation 825 to continue to buffer transfer the data packets to the host platform 205.

If at operation 830 the IX interface circuitry 212 determines that there are no remaining data packets in the off-chip memory circuitry 213, the IX interface circuitry 212 may proceed to operation 835 to deactivate the IX 206, and may then proceed to operation 840 to determine whether a change in the data Tx rate has changed. If at operation 840 the IX interface circuitry 212 determines that there has not been a detected change in the data Tx rate, the IX interface circuitry 212 may proceed back to operation 805 to buffer data packets in the off-chip memory circuitry 213. If at operation 840 the IX interface circuitry 212 determines that a change in the data Tx rate has been detected, the IX interface circuitry 212 may return back to process 600 (e.g., operation 630).

Figure 9:
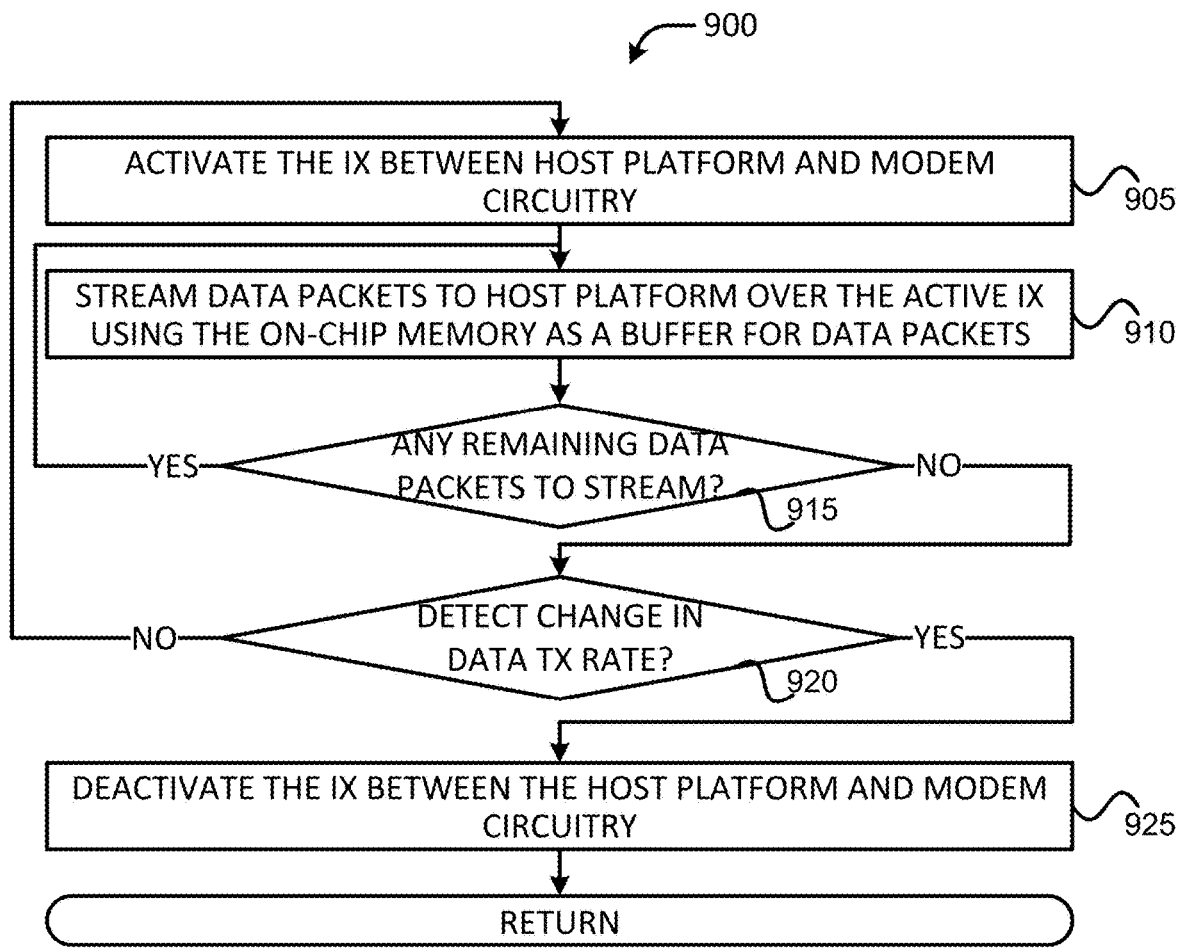
FIG. 9 depicts an example data transfer process of a third mode of operation, in accordance with various embodiments.

FIG. 9 shows a data transfer process 900 of a third mode of operation, in accordance with various embodiments. Process 900 may correspond with operation 630 of process 600 discussed previously. Process 900 may begin at operation 905 where the IX interface circuitry 212 may activate the IX 206 between the host platform 205 and the IX interface circuitry 212. At operation 910, the IX interface circuitry 212 may stream data packets to the host platform 205 using the on-chip memory circuitry as a buffer for received data packets.

At operation 915, the IX interface circuitry 212 may determine whether there are any remaining data packets to stream. If at operation 915 the IX interface circuitry 212 determines that there are remaining data packets to be streamed, the IX interface circuitry 212 may proceed back to operation 905 to continue to stream the data packets to the host platform 205.

If at operation 915 the IX interface circuitry 212 determines that there are no remaining data packets to be streamed, the IX interface circuitry 212 may proceed to operation 920 to determine whether a change in the data Tx rate has changed. If at operation 920 the IX interface circuitry 212 determines that there has not been a detected change in the data Tx rate, the IX interface circuitry 212 may proceed back to operation 905 to stream data packets to the host platform 205. If at operation 920 the IX interface circuitry 212 determines that a change in the data Tx rate has been detected, the IX interface circuitry 212 may proceed to operation 925 to deactivate the IX 206, and may the return back to process 600 (e.g., operation 625).

Some non-limiting examples are as follows. The following examples pertain to further embodiments, and specifics in the examples may be used anywhere in one or more embodiments discussed previously. Any of the following examples may be combined with any other example, or any embodiment discussed herein, unless explicitly stated otherwise.

Example 1 may include a system on chip (SoC) to be employed as wireless communication modem circuitry, the SoC comprising: baseband circuitry; on-chip memory circuitry; and interconnect (IX) interface circuitry, wherein the IX interface circuitry is to couple the modem circuitry with a host platform via an IX between the SoC and the host platform, and wherein the IX interface circuitry is to transfer data received by the baseband circuitry to the host platform, wherein to transfer data to the host platform, the IX interface circuitry is to: determine a current data rate of data packets received by the baseband circuitry; and control transfer of the data packets to the host platform over the IX in a data transfer rate that is selected based at least in part on the determined data rate.

Example 2 may include the SoC of example 1 and/or some other examples herein, wherein, when the current data rate is less than or equal to a threshold, the IX interface circuitry is to: control storage of the received data packets in the on-chip memory circuitry; and transfer the stored data packets to the host platform when an aggregation period has expired.

Example 3 may include the SoC of example 2 and/or some other examples herein, wherein the IX is to be in an "off" state while the received data packets are to be stored in the on-chip memory circuitry, and the IX interface circuitry is to: activate the IX to be in an "on" state prior to transfer of the stored data packets to the host platform.

Example 4 may include the SoC of example 2 and/or some other examples herein, wherein the threshold is a first threshold, and when the current data rate is greater than or equal to a second threshold, the IX interface circuitry is to: stream the data packets to the host platform as the data packets are received and without storing the received data packets in the on-chip memory circuitry.

Example 5 may include the SoC of example 4 and/or some other examples herein, wherein, to stream the data packets to the host platform, the IX interface circuitry is to: store the data packets in the on-chip memory circuitry as the data packets are received by the baseband circuitry; and transfer the stored data packets to the host platform.

Example 6 may include the SoC of example 4 and/or some other examples herein, wherein the IX is a first IX, and the SoC is included in a multi-chip package (MCP), wherein the MCP comprises in-package memory circuitry, and wherein the SoC is coupled with the in-package memory circuitry via a second IX.

Example 7 may include the SoC of example 6 and/or some other examples herein, wherein the aggregation period is a first aggregation period, and when the current data rate is greater than the first threshold and less than the second threshold, the IX interface circuitry is to: transfer the received data packets to the in-package memory circuitry for storage over the second IX; and when a second aggregation period expires, obtain the data packets stored in the in-package memory circuitry over the second IX, and transfer the data packets to the host platform over the first IX as the data packets are obtained from the in-package memory circuitry.

Example 8 may include the SoC of example 7 and/or some other examples herein, wherein the first aggregation period is 512 microseconds (µs), and the second aggregation period is 1 millisecond (ms) or 2 ms.

Example 9 may include the SoC of example 6 and/or some other examples herein, wherein the aggregation period is a first aggregation period, and the IX interface circuitry is to: transfer the received data packets to the in-package memory circuitry over the second IX when the on-chip memory circuitry is full; and when a second aggregation period expires, obtain the data packets stored in the in-package memory circuitry, and transfer, to the host platform, the data packets stored in the on-chip memory circuitry and the data packets obtained from the in-package memory circuitry as the data packets are obtained from the in-package memory circuitry.

Example 10 may include the SoC of example 6 and/or some other examples herein, wherein: the on-chip memory circuitry comprises static random access memory (SRAM);

the in-package memory circuitry comprises double data rate (DDR) random access memory (RAM); and the IX interface circuitry is an Intel® Ultra Path Interface (UPI) controller when the IX is a UPI IX or the IX interface circuitry is a peripheral component interconnect express (PCIe) interface controller when the IX is a PCIe IX.

Example 11 may include a multi-chip package (MCP) to be employed as wireless communication modem circuitry, the MCP comprising: a system on chip (SoC) having baseband circuitry, on-chip memory circuitry, and interconnect (IX) interface circuitry, wherein the modem circuitry is coupled with a host platform via a first IX that is between the IX interface circuitry and the host platform; and in-package memory circuitry coupled with the SoC via a second IX between the SoC and the in-package memory circuitry, wherein the IX interface circuitry is to operate in a rate-adaptive manner in transferring data received by the baseband circuitry to the host platform such that: as the modem circuitry obtains data packets at a first data rate, the IX interface circuitry is to transfer the data packets to the host platform over the first IX without storing the data packets in the in-package memory circuitry, and as the modem circuitry obtains data packets at a second data rate, the IX interface circuitry is to transfer the data packets to the host platform over the first IX after partially or fully storing the data packets in the in-package memory circuitry.

Example 12 may include the MCP of example 11 and/or some other examples herein, wherein the first IX is to be in an "off" state while the received data packets are to be stored in the on-chip memory circuitry, and when a current data rate is less than or equal to the first data rate, the IX interface circuitry is to: control storage of received data packets in the on-chip memory circuitry; periodically activate the first IX to be in an "on" state; and transfer the stored data packets to the host platform when an aggregation period expires.

Example 13 may include the MCP of example 12 and/or some other examples herein, wherein the aggregation period is 512 microseconds (μs).

Example 14 may include the MCP of example 12 and/or some other examples herein, wherein, when a current data rate is greater than or equal to the second data rate, the IX interface circuitry is to: stream the data packets to the host platform as the data packets are made available by the baseband circuitry.

Example 15 may include the MCP of example 14 and/or some other examples herein, wherein, to stream the data packets to the host platform, the IX interface circuitry is to: store the data packets in the on-chip memory circuitry as the data packets are made available by the baseband circuitry; and transfer the stored data packets to the host platform.

Example 16 may include the MCP of example 11 and/or some other examples herein, wherein, when a current data rate is greater than the first data rate and less than the second data rate, the IX interface circuitry is to: transfer the received data packets to the in-package memory circuitry for storage over the second IX; obtain the data packets stored in the in-package memory circuitry over the second IX when an aggregation period expires; and transfer the data packets to the host platform over the first IX as the data packets are obtained from the in-package memory circuitry.

Example 17 may include the MCP of example 16 and/or some other examples herein, wherein the aggregation period is a configurable time period to be set by a user or a manufacturer of the MCP.

Example 18 may include the MCP of example 16 and/or some other examples herein, wherein the IX interface circuitry is to: transfer demodulated data packets to the in-package memory circuitry over the second IX when the on-chip memory circuitry is full.

Example 19 may include the MCP of example 16 and/or some other examples herein, wherein: the on-chip memory circuitry comprises static random access memory (SRAM); the in-package memory circuitry comprises double data rate (DDR) random access memory (RAM); and the IX interface circuitry comprises: an Intel® Ultra Path Interface (UPI) controller when the IX is a UPI IX, or a peripheral component interconnect express (PCIe) interface controller when the IX is a PCIe IX.

Example 20 may include the MCP of examples 11-19 and/or some other examples herein, wherein the modem circuitry and the host platform are to be implemented in a user equipment (UE).

Example 21 may include a user equipment (UE) comprising: application circuitry comprising one or more processing cores and one or more memory devices; and modem circuitry coupled with the application circuitry via a first interconnect (IX), the modem circuitry comprising a system on chip (SoC) coupled with in-package memory circuitry via a second IX, the SoC comprising: baseband circuitry with on-chip memory circuitry, wherein the baseband circuitry is to demodulate signals received over an air interface to produce data packets; and IX interface circuitry, wherein the IX interface circuitry is to control transfer of the data packets to the application circuitry based on a data rate at which the signals are received over the air interface.

Example 22 may include the UE of example 21 and/or some other examples herein, wherein the IX interface circuitry is to: control storage of the data packets in the on-chip memory circuitry; when the signals are received at a first data rate, periodically activate the first IX to be in an "on" state, transfer, over the activated first IX, the data packets from the on-chip memory circuitry to the application circuitry when a first aggregation period expires, and deactivate the first IX to be in an "off" state after transfer of the data packets; and when the signals are received at a second data rate that is greater than the first data rate, transfer the stored data packets to the application circuitry.

Example 23 may include the UE of example 22 and/or some other examples herein, wherein, when the signals are received at a third data rate that is greater than the first data rate and less than the second data rate, the IX interface circuitry is to: transfer, over the second IX, the received data packets to the in-package memory circuitry for storage, obtain, over the second IX, the data packets stored in the in-package memory circuitry when a second aggregation period expires, and transfer the data packets to the host platform over the first IX as the data packets are obtained from the in-package memory circuitry.

Example 24 may include the UE of example 23 and/or some other examples herein, wherein the first aggregation period is configurable to have a first value and the second aggregation period is configurable to have a second value, wherein the first value is different than the second value.

Example 25 may include the UE of example 23 and/or some other examples herein, wherein the IX interface circuitry is to: transfer, over the second IX, the demodulated data packets to the in-package memory circuitry when the on-chip memory circuitry is full.

Example 26 may include a method for transferring data from modem circuitry to application circuitry in a data transfer rate-adaptive manner, the method comprising: determining or causing to determine, by the modem circuitry, a current data rate of data packets received by the modem circuitry; and transferring or causing to transfer, by the modem circuitry, the data packets to the application circuitry over an interconnect (IX) between the modem circuitry and the application circuitry using a data transfer rate that is selected based at least in part on the determined data transmission rate.

Example 27 may include the method of example 26 and/or some other examples herein, wherein, when the current data rate is less than or equal to a threshold, the method comprises: storing or causing to store, by the modem circuitry, the received data packets in on-chip memory circuitry of the modem circuitry; and transferring or causing to transfer, by the modem circuitry, the stored data packets to the application circuitry when an aggregation period has expired.

Example 28 may include the method of example 27 and/or some other examples herein, wherein the IX is to be in an "off" state while the received data packets are to be stored in the on-chip memory circuitry, and the method comprises: activating or causing to activate, by the modem circuitry, the IX to be in an "on" state prior to transferring the stored data packets to the application circuitry.

Example 29 may include the method of example 27 and/or some other examples herein, wherein the threshold is a first threshold, and when the current data rate is greater than or equal to a second threshold, the method comprises: streaming or causing to stream, by the modem circuitry, the data packets to the application circuitry as the data packets are received and without storing the received data packets in the on-chip memory circuitry.

Example 30 may include the method of example 29 and/or some other examples herein, wherein streaming the data packets to the application circuitry, the method comprises: storing or causing to store, by the modem circuitry, the data packets in the on-chip memory circuitry as the data packets are received by the baseband circuitry; and transferring or causing to transfer, by the modem circuitry, the stored data packets to the application circuitry.

Example 31 may include the method of example 29 and/or some other examples herein, wherein the IX is a first IX, and the modem circuitry comprises in-package memory circuitry, and wherein data is to be transferred to the in-package memory circuitry over a second IX.

Example 32 may include the method of example 31 and/or some other examples herein, wherein the aggregation period is a first aggregation period, and when the current data rate is greater than the first threshold and less than the second threshold, the method comprises: transferring or causing to transfer, by the modem circuitry, the received data packets to the in-package memory circuitry for storage over the second IX; and when a second aggregation period expires, obtaining or causing to obtain, by the modem circuitry, the data packets stored in the in-package memory circuitry over the second IX, and transferring or causing to transfer, by the modem circuitry, the data packets to the application circuitry over the first IX as the data packets are obtained from the in-package memory circuitry.

Example 33 may include the method of example 32 and/or some other examples herein, wherein the first aggregation period is 512 microseconds (µs), and the second aggregation period is 1 millisecond (ms) or 2 ms.

Example 34 may include the method of example 31 and/or some other examples herein, wherein the aggregation period is a first aggregation period, and the method comprises: transferring or causing to transfer, by the modem circuitry, the received data packets to the in-package memory circuitry over the second IX when the on-chip memory circuitry is full; and when a second aggregation period expires, obtaining or causing to obtain, by the modem circuitry, the data packets stored in the in-package memory circuitry, and transferring or causing to transfer, by the modem circuitry to the application circuitry, the data packets stored in the on-chip memory circuitry and the data packets obtained from the in-package memory circuitry as the data packets are obtained from the in-package memory circuitry.

Example 35 may include a method for transferring data from modem circuitry to application circuitry in a data transfer rate-adaptive manner, the method comprising: transferring or causing to transfer, by the modem circuitry as the modem circuitry obtains data packets at a first data rate, data packets to the application circuitry over a first interconnect (IX) between the modem circuitry and the application circuitry without storing the data packets in in-package memory circuitry of the modem circuitry; and transferring or causing to transfer, by the modem circuitry as the modem circuitry obtains data packets at a second data rate, the data packets to the application circuitry over the first IX after partially or fully storing the data packets in the in-package memory circuitry.

Example 36 may include the method of example 35 and/or some other examples herein, wherein the first IX is to be in an "off" state while the received data packets are to be stored in the on-chip memory circuitry, and when a current data rate is less than or equal to the first data rate, the method comprises: storing or causing to store, by the modem circuitry, the received data packets in the on-chip memory circuitry; periodically activating or causing to periodically activate the first IX to be in an "on" state; and transferring or causing to transfer, by the modem circuitry, the stored data packets to the application circuitry when an aggregation period expires.

Example 37 may include the method of example 36 and/or some other examples herein, wherein the aggregation period is 512 microseconds (µs).

Example 38 may include the method of example 36 and/or some other examples herein, wherein, when a current data rate is greater than or equal to the second data rate, the method comprises: streaming or causing to stream, by the modem circuitry, the data packets to the application circuitry as the data packets are made available by the baseband circuitry.

Example 39 may include the method of example 38 and/or some other examples herein, wherein streaming the data packets to the application circuitry, the method comprises: storing or causing to store, by the modem circuitry, the data packets in the on-chip memory circuitry as the data packets are made available by the baseband circuitry; and transferring or causing to transfer, by the modem circuitry, the stored data packets to the application circuitry.

Example 40 may include the method of example 35 and/or some other examples herein, wherein, when a current data rate is greater than the first data rate and less than the second data rate, the method comprises: transferring or causing to transfer, by the modem circuitry, the received data packets to the in-package memory circuitry for storage over the second IX; obtaining or causing to obtain, by the modem circuitry, the data packets stored in the in-package memory circuitry over the second IX when an aggregation period expires; and transferring or causing to transfer, by the modem circuitry, the data packets to the application circuitry over the first IX as the data packets are obtained from the in-package memory circuitry.

Example 41 may include the method of example 40 and/or some other examples herein, wherein the aggregation period is a configurable time period to be set by a user or a manufacturer of the modem circuitry.

Example 42 may include the method of example 40 and/or some other examples herein, further comprising: transferring or causing to transfer, by the modem circuitry, demodulated data packets to the in-package memory circuitry over the second IX when the on-chip memory circuitry is full.

Example 43 may include a data transfer rate-adaptive method for transferring data from modem circuitry to application circuitry, the method comprising: receiving or causing to receive, by the modem circuitry, one or more signals over an air interface; demodulating or causing to demodulate, by the modem circuitry, the one or more signals to produce one or more data packets; determining or causing to determine, by the modem circuitry, a current data rate at which the one or more signals are received over the air interface or at which the one or more data packets are made available for the application circuitry; and transferring or causing to transfer, by the modem circuitry over an interconnect (IX) between the modem circuitry and the application circuitry, the data packets to the application circuitry based on the determined data rate.

Example 44 may include the method of example 43 and/or some other examples herein, further comprising: storing or causing to store, by the modem circuitry, the data packets in on-chip memory circuitry or the modem circuitry; when the current data rate is a first data rate, periodically activating or causing to periodically activate, by the modem circuitry, the IX to be in an "on" state, transferring or causing to transfer, by the modem circuitry over the activated IX, the data packets from the on-chip memory circuitry to the application circuitry when a first aggregation period expires, and deactivating or causing to deactivate, by the modem circuitry, the IX to be in an "off" state after transfer of the data packets; and when the current data rate is a second data rate that is greater than the first data rate, transferring or causing to transfer, by the modem circuitry, the stored data packets to the application circuitry.

Example 45 may include the method of example 44 and/or some other examples herein, wherein the IX is a first IX and a second IX is for transferring data to be stored on in-package memory circuitry, and wherein, when the current data rate is a third data rate that is greater than the first data rate and less than the second data rate, the method comprises: transferring or causing to transfer, by the modem circuitry, over the second IX, the received data packets to the in-package memory circuitry for storage; obtaining or causing to obtain, by the modem circuitry over the second IX, the data packets stored in the in-package memory circuitry when a second aggregation period expires, and transferring or causing to transfer, by the modem circuitry, the data packets to the application circuitry over the first IX as the data packets are obtained from the in-package memory circuitry.

Example 46 may include the method of example 45 and/or some other examples herein, wherein the first aggregation period is configurable to have a first value and the second aggregation period is configurable to have a second value, wherein the first value is different than the second value.

Example 47 may include the method of example 45 and/or some other examples herein, further comprising: transferring or causing to transfer, by the modem circuitry over the second IX, the data packets to the in-package memory circuitry when the on-chip memory circuitry is full.

Example 48 may include one or more computer-readable storage media comprising instructions, wherein execution of the instructions by one or more processors of an electronic device is to cause the electronic device to perform one or more elements of a method described in or related to any of examples 26-47, or any other method, procedure, or process described herein, or portions or parts thereof.

Example 49 may include an apparatus comprising logic, modules, or circuitry to perform one or more elements of a method described in or related to any of examples 26-47, or any other method, procedure, or process described herein, or portions or parts thereof.

Example 50 may include an apparatus comprising means to perform one or more elements of a method described in or related to any of examples 26-47, or any other method, procedure, or process described herein, or portions or parts thereof.

Example 51 may include a method, technique, or process as described in or related to any of examples 1-47, or portions or parts thereof.

Example 52 may include an apparatus comprising: one or more processors and one or more computer-readable storage media (CRSM) comprising instructions that, when executed by the one or more processors, cause the one or more processors to perform the method, techniques, or process as described in or related to any of examples 26-47, or portions or parts thereof.

Example 53 may include the one or more CRSM of examples 48, E18, and/or some other examples herein, wherein the CRSM is a non-transitory CRSM.

Example 54 may include a signal as described in or related to any of examples 1-47, or portions or parts thereof.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine-readable medium, and transmit and receive data from one or more other devices in a communications network. A computer device may be considered synonymous to, and may hereafter be occasionally referred to as, a computer, computing platform, computing device, etc. The term "computer system" may include any type of interconnected electronic devices, computer devices, or components thereof. Additionally, the terms "computer system" and/or "system" may refer to various components of a computer that are communicatively coupled with one another. Furthermore, the terms "computer system" and/or "system" may refer to multiple computer devices and/or multiple computing systems that are communicatively coupled with one another and configured to share computing and/or networking resources. Examples of "computer devices," "computer systems," etc. may include cellular phones or smartphones, feature phones, tablet personal computers, wearable computing devices, autonomous sensors, laptop computers, desktop personal computers, video game consoles, digital media players, handheld messaging devices, personal data assistants, electronic book readers, augmented reality devices, servers (e.g., stand-alone, rack-mounted, blade, etc.), cloud computing services/systems, network elements, in-vehicle infotainment (IVI), in-car entertainment (ICE) devices, an instrument cluster (IC), head-up display (HUD) devices, onboard diagnostic (OBD) devices, dashtop mobile equipment (DME), mobile data terminals (MDTs), electronic engine management system (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

The invention claimed is:

1. A system on chip (SoC) to be employed as wireless communication modem circuitry, the SoC comprising:
   baseband circuitry;
   on-chip memory circuitry of the SoC; and
   interconnect (IX) interface circuitry coupled with the baseband circuitry and the on-chip memory, wherein the IX interface circuitry is arranged to couple the modem circuitry with a host platform via an IX between the SoC and the host platform, and wherein the IX interface circuitry is arranged to transfer data received by the baseband circuitry to the host platform, wherein, to transfer data to the host platform, the IX interface circuitry is arranged to:
   determine a current data transmission (Tx) rate of data packets received by the baseband circuitry; and
   transfer the data packets to the host platform over the IX at a data transfer rate that is selected based at least in part on the determined data Tx rate.

2. The SoC of claim 1, wherein, when the current data Tx rate is less than or equal to a threshold, the IX interface circuitry is arranged to:
   control storage of the received data packets in the on-chip memory circuitry; and
   transfer the stored data packets to the host platform when an aggregation period has expired.

3. The SoC of claim 2, wherein the IX is arranged to be in an "off" state while the received data packets are to be stored in the on-chip memory circuitry, and the IX interface circuitry is arranged to:
   activate the IX to be in an "on" state prior to transfer of the stored data packets to the host platform.

4. The SoC of claim 2, wherein the threshold is a first threshold, and when the current data Tx rate is greater than or equal to a second threshold, the IX interface circuitry is arranged to:
   stream the data packets to the host platform as the data packets are received and without storing the received data packets in the on-chip memory circuitry.

5. The SoC of claim 4, wherein, to stream the data packets to the host platform, the IX interface circuitry is arranged to:
   store the data packets in the on-chip memory circuitry as the data packets are received by the baseband circuitry; and
   transfer the stored data packets to the host platform.

6. The SoC of claim 4, wherein the IX is a first IX, and the SoC is included in a multi-chip package (MCP), wherein the MCP comprises in-package memory circuitry, and wherein the SoC is coupled with the in-package memory circuitry via a second IX.

7. The SoC of claim 6, wherein the aggregation period is a first aggregation period, and when the current data Tx rate is greater than the first threshold and less than the second threshold, the IX interface circuitry is arranged to:
   transfer, over the second IX, the received data packets to the in-package memory circuitry for storage; and
   when a second aggregation period expires,
      obtain the data packets stored in the in-package memory circuitry over the second IX, and
      transfer the data packets to the host platform over the first IX as the data packets are obtained from the in-package memory circuitry.

8. The SoC of claim 7, wherein the first aggregation period is 512 microseconds (μs), and the second aggregation period is 1 millisecond (ms) or 2 ms.

9. The SoC of claim 6, wherein the aggregation period is a first aggregation period, and the IX interface circuitry is arranged to:
   transfer the received data packets to the in-package memory circuitry over the second IX when the on-chip memory circuitry is full; and
   when a second aggregation period expires,
      obtain the data packets stored in the in-package memory circuitry, and
      transfer, to the host platform, the data packets stored in the on-chip memory circuitry and the data packets obtained from the in-package memory circuitry as the data packets are obtained from the in-package memory circuitry.

10. The SoC of claim 6, wherein:
   the on-chip memory circuitry comprises static random access memory (SRAM);

the in-package memory circuitry comprises double data rate (DDR) random access memory (RAM); and the IX interface circuitry is an Intel® Ultra Path Interface (UPI) controller when the IX is a UPI IX or the IX interface circuitry is a peripheral component interconnect express (PCIe) interface controller when the IX is a PCIe IX.

11. A multi-chip package (MCP) to be employed as wireless communication modem circuitry, the MCP comprising:

a system on chip (SoC) having baseband circuitry, on-chip memory circuitry, and interconnect (IX) interface circuitry, wherein the modem circuitry is coupled with a host platform via a first IX that is between the IX interface circuitry and the host platform; and in-package memory circuitry coupled with the SoC via a second IX between the SoC and the in-package memory circuitry, wherein the IX interface circuitry is arranged to transfer data received by the baseband circuitry to the host platform such that:

as the modem circuitry obtains data packets at a first data transmission (Tx) rate, the IX interface circuitry is arranged to transfer the data packets to the host platform over the first IX without storing the data packets in the in-package memory circuitry, and as the modem circuitry obtains data packets at a second data Tx rate, the IX interface circuitry is arranged to transfer the data packets to the host platform over the first IX after partially or fully storing the data packets in the in-package memory circuitry.

12. The MCP of claim 11, wherein the first IX is arranged to be in an "off" state while the received data packets are to be stored in the on-chip memory circuitry, and when a current data Tx rate is less than or equal to the first data Tx rate, the IX interface circuitry is arranged to:

control storage of received data packets in the on-chip memory circuitry;

periodically activate the first IX to be in an "on" state; and transfer the stored data packets to the host platform when an aggregation period expires.

13. The MCP of claim 12, wherein the aggregation period is 512 microseconds (μs).

14. The MCP of claim 12, wherein, when a current data Tx rate is greater than or equal to the second data Tx rate, the IX interface circuitry is arranged to:

stream the data packets to the host platform as the data packets are made available by the baseband circuitry.

15. The MCP of claim 14, wherein, to stream the data packets to the host platform, the IX interface circuitry is arranged to:

store the data packets in the on-chip memory circuitry as the data packets are made available by the baseband circuitry; and transfer the stored data packets to the host platform.

16. The MCP of claim 11, wherein, when a current data Tx rate is greater than the first data Tx rate and less than the second data Tx rate, the IX interface circuitry is arranged to:

transfer the received data packets to the in-package memory circuitry for storage over the second IX;

obtain the data packets stored in the in-package memory circuitry over the second IX when an aggregation period expires; and transfer the data packets to the host platform over the first IX as the data packets are obtained from the in-package memory circuitry.

17. The MCP of claim 16, wherein the aggregation period is a configurable time period to be set by a user or a manufacturer of the MCP.

18. The MCP of claim 16, wherein the IX interface circuitry is arranged to:

transfer demodulated data packets to the in-package memory circuitry over the second IX when the on-chip memory circuitry is full.

19. The MCP of claim 16, wherein:

the on-chip memory circuitry comprises static random access memory (SRAM);

the in-package memory circuitry comprises double data rate (DDR) random access memory (RAM); and the IX interface circuitry comprises:

an Intel® Ultra Path Interface (UPI) controller when the IX is a UPI IX, or a peripheral component interconnect express (PCIe) interface controller when the IX is a PCIe IX.

20. The MCP of claim 11, wherein the modem circuitry and the host platform are to be implemented in a user equipment (UE).

21. A user equipment (UE) comprising:

application circuitry comprising one or more processing cores and one or more memory devices; and modem circuitry coupled with the application circuitry via a first interconnect (IX), the modem circuitry comprising a system on chip (SoC) coupled with in-package memory circuitry via a second IX, the SoC comprising:

baseband circuitry with on-chip memory circuitry, wherein the baseband circuitry is arranged to demodulate signals received over an air interface to produce data packets; and IX interface circuitry, wherein the IX interface circuitry is arranged to control transfer of the data packets to the application circuitry based on a data transmission (Tx) rate at which the signals are received over the air interface.

22. The UE of claim 21, wherein the IX interface circuitry is arranged to:

control storage of the data packets in the on-chip memory circuitry;

when the signals are received at a first data Tx rate, periodically activate the first IX to be in an "on" state, transfer, over the activated first IX, the data packets from the on-chip memory circuitry to the application circuitry when a first aggregation period expires, and deactivate the first IX to be in an "off" state after transfer of the data packets; and when the signals are received at a second data Tx rate that is greater than the first data Tx rate, transfer the stored data packets to the application circuitry.

23. The UE of claim 22, wherein, when the signals are received at a third data Tx rate that is greater than the first data Tx rate and less than the second data Tx rate, the IX interface circuitry is arranged to:

transfer, over the second IX, the received data packets to the in-package memory circuitry for storage, obtain, over the second IX, the data packets stored in the in-package memory circuitry when a second aggregation period expires, and transfer the data packets to the host platform over the first IX as the data packets are obtained from the in-package memory circuitry.

24. The UE of claim 23, wherein the first aggregation period is configurable to have a first value and the second aggregation period is configurable to have a second value, wherein the first value is different than the second value.

25. The UE of claim 23, wherein the IX interface circuitry is arranged to:
    transfer, over the second IX, the demodulated data packets to the in-package memory circuitry when the on-chip memory circuitry is full.

\* \* \* \* \*